United States Patent

Matsunaga et al.

[19]

[11] Patent Number: 6,044,420
[45] Date of Patent: Mar. 28, 2000

[54] TACIT VIEWING SYSTEM, METHOD AND MEDIUM FOR REPRESENTING PERIPHERAL DATA RELATED TO FOCUSED DATA WITH TIMING OF REPRESENTATION DETERMINED BY A REPRESENTATION TIMING DETERMINING ELEMENT

[75] Inventors: Yoshifumi Matsunaga; Hirohito Shibata; Toshikatsu Suzuki, all of Nakai-machi, Japan

[73] Assignee: Fuji Xerox Co., Ltd., Tokyo, Japan

[21] Appl. No.: 09/016,232

[22] Filed: Jan. 30, 1998

[30] Foreign Application Priority Data

Feb. 3, 1997 [JP] Japan ................... 9-034354

[51] Int. Cl.[7] .................. G06F 13/00; G06F 17/30; G06B 11/01; G06B 9/02; G09G 5/00
[52] U.S. Cl. .................. 710/58; 700/17; 700/83; 700/84; 700/85; 710/5; 707/102; 707/103; 345/112
[58] Field of Search .................. 707/1–10, 502–513, 707/515–517, 2, 3, 102, 103; 708/112; 710/5, 6, 58; 700/83, 84, 85, 17; 345/112; 395/670, 672; 709/1, 3

[56] References Cited

U.S. PATENT DOCUMENTS

| | | | |
|---|---|---|---|
| 4,563,740 | 1/1986 | Blake et al. | 364/414 |
| 4,660,101 | 4/1987 | Martin | 358/342 |
| 5,276,804 | 1/1994 | Ishiyama | 395/164 |
| 5,392,337 | 2/1995 | Baals et al. | 379/96 |
| 5,448,695 | 9/1995 | Douglas et al. | 395/155 |
| 5,523,945 | 6/1996 | Satoh et al. | 704/9 |
| 5,621,429 | 4/1997 | Yamaashi et al. | 345/119 |
| 5,632,030 | 5/1997 | Takano et al. | 395/522 |
| 5,649,234 | 7/1997 | Klappert et al. | 395/806 |
| 5,724,567 | 3/1998 | Rose et al. | 707/2 |
| 5,745,895 | 4/1998 | Bingham et al. | 707/10 |
| 5,752,242 | 5/1998 | Havens | 707/3 |
| 5,754,176 | 5/1998 | Crawford | 345/338 |
| 5,790,950 | 8/1998 | Suzuki et al. | 435/427 |
| 5,805,118 | 9/1998 | Mishra et al. | 345/1 |
| 5,832,473 | 11/1998 | Lee et al. | 707/2 |
| 5,842,009 | 11/1998 | Borovoy et al. | 707/1 |
| 5,842,201 | 11/1998 | Wallack | 707/3 |
| 5,857,181 | 1/1999 | Augenbraun et al. | 707/2 |
| 5,861,880 | 1/1999 | Shimizu et al. | 345/302 |

(List continued on next page.)

OTHER PUBLICATIONS

Card, S.K. et al. "The Information Visualizer, An Information Workspace," Proc. ACM CHI '91, pp. 181–188.

Neuwirth, C.M. et al. "Issues in the Design of Computer Support for Co-authoring and Commenting," Proc. Of CSCW '90, pp. 183–95.

Halasz, T. P. et al. "NoteCards in a Nutshell," CHI+GI, pp. 45–52, 1987.

Uting, K. et al. "Context and Orientation in Hypermedia Networks," ACM Transactions on Information Systems, vol. 7, No. 1, pp. 58–83, 1989.

Primary Examiner—Thomas C. Lee
Assistant Examiner—Tanh Nguyen
Attorney, Agent, or Firm—Oliff & Berridge, PLC

[57] ABSTRACT

A data outputting system realizes tacit viewing by representing pieces of peripheral data related to focused data to which a user pays attention at an appropriate timing. In the system, the data to which the user pays attention is selected by a data designating element as focused data from the plural pieces of data held by a database, and a focused data representing element makes the outputting element output the focused data. A peripheral data determining element selects the pieces of peripheral data from the plural pieces of data held by the database based on the degree of relation to the focused data, and a timing determining element determines the timing of representation of the peripheral data in accordance with the attributes of the focused data, the history of representation of the focused data in the past, the attributes of the user, and so on. Then a peripheral data representing element makes the outputting element output the pieces of peripheral data at the determined timing.

17 Claims, 37 Drawing Sheets

U.S. PATENT DOCUMENTS

| | | | |
|---|---|---|---|
| 5,864,848 | 1/1999 | Horvitz et al. | 707/6 |
| 5,873,107 | 2/1999 | Borovoy et al. | 707/501 |
| 5,884,326 | 3/1999 | Weinger et al. | 707/201 |
| 5,898,430 | 4/1999 | Matsuzawa et al. | 345/302 |
| 5,913,214 | 6/1999 | Madnick et al. | 707/10 |
| 5,933,088 | 8/1999 | Lipp | 340/825.44 |

LAYOUT TABLE 40

| POINTER TO DATA | POINTER TO DATA |
|---|---|
| (2) | |
| (3) | |
| (4) | |
| (5) | |
| (6) | |
| (7) | |
| (8) | |
| (9) | |

FIG.8

TIMING TABLE 42

| TIME OF REPRESENTATION OF FOCUSED DATA | |
|---|---|
| METHOD OF DETERMINING TIMING | |
| NUMERICAL INFORMATION | |

FIG.9

FOCUSED DATA

```
TODAY'S SCHEDULE

9:30-11:00 STRATEGY MEETING
MEETING WITH MR. A IN THE MORNING
13:15-14:30 MEETING WITH GROUP B
AFTER FIXED WORKING HOURS MEETING WITH
MR. C ABOUT "FORUM '96"
```

DECEMBER 9, SCHEDULE MR. A, GROUP B, FORUM, MR. C

FIG.20

CONTENT OF TIMING TABLE 42

| TIME OF REPRESENTATION OF FOCUSED DATA | 13:46:22 |
|---|---|
| METHOD OF DETERMINING TIMING | PREDICTION OF READING COMPLETION TIME |
| NUMERICAL INFORMATION | TODAY'S SCHEDULE<br>9:30-11:00 STRATEGY MEETING<br>MEETING WITH MR. A IN THE MORNING<br>13:15-14:30 MEETING WITH GROUP B<br>AFTER FIXED WORKING HOURS,<br>MEETING WITH MR. C ABOUT<br>"FORUM '96" |

FIG.21

PERIPHERAL DATA

DECEMBER 4   ELECTRONIC MAIL

SENDER: A * *

I'D LIKE TO HAVE A MEETING WITH YOU

* * * *

DECEMBER 9   ELECTRONIC MAIL, A * *

FIG.22

FOCUSED DATA HISTORY TABLE 61

| FOCUSED DATA | NUMBER OF TIMES |
|---|---|
| DATA 1 | 1 |
| DATA 2 | 3 |
| DATA 3 | 1 |
| ... | ... |

FIG.24

FOCUSED DATA HISTORY TABLE

| FOCUSED DATA | DATE AND TIME OF LAST REPRESENTATION AS FOCUSED DATA |
|---|---|
| DATA 1 | |
| DATA 2 | |
| DATA 3 | |
| ... | ... |

FIG.27

TIMING HISTORY TABLE — 72

| NUMBER OF TIMES OF REPRESENTATION OF PERIPHERAL DATA | 22 |
|---|---|
| AVERAGE WRITING TIME FOR REPRESENTING PERIPHERAL DATA | 4.44 |

LANGUAGE LIST TABLE

| LANGUAGE | NATIVE LANGUAGE | FAMILIAR FOREIGN LANGUAGE |
|---|---|---|
| JAPANESE (CHARACTER) | 10 | 5 |
| ENGLISH (WORD) | 10 | 5 |
| ... | ... | ... |

FIG.37

TACIT VIEWING SYSTEM, METHOD AND MEDIUM FOR REPRESENTING PERIPHERAL DATA RELATED TO FOCUSED DATA WITH TIMING OF REPRESENTATION DETERMINED BY A REPRESENTATION TIMING DETERMINING ELEMENT

BACKGROUND OF THE INVENTION

1. Field of the Invention

The present invention relates to a data outputting system which implements a new method called tacit viewing as a new way of interaction between the user and data. More specifically, as a background or the like, the system represents the peripheral data related to the focused data to which attention is paid by the user at a certain time and at an appropriate timing.

2. Discussion of the Related Art

At first, for explaining the concept of the new method called tacit viewing, the background of the present invention is discussed.

Conventionally, there have been methods where the user takes out desirable pieces of data from an information system storing a large amount of data, which can be roughly classified into the following four types.

The first type is a method called retrieval, in which a user takes out the pieces of information with a specific purpose.

In general, when a piece of information is retrieved, the user can immediately confirm whether it is the desired information or not. If it is not the desired one, or insufficient, further retrieval is conducted. Extraction of pieces of information by keyword retrieval falls in this category. Substantially, the process of looking for and discovering something in our daily life, for example, based on a memory such as "The material should have been in this cabinet", also falls into the same category. The characteristic of the retrieval is to be conducted on the basis of the specific intention or purpose.

The second type is a method called browsing, in which a user takes multiple pieces of information with no specific or definite intention, or with weak or indefinite intention or purpose.

Searching for pieces of information through a system browser of "Smalltalk" or a browser of the Internet corresponds to this case. Browsing around backbones of books in a bookstore also falls into this category. According to browsing, the range of objects to be searched is wider than that in the case of retrieval.

The third type is a method called overviewing which takes a view of relations among pieces of information, or structure of groups of information, contained in the whole retrieval object or its parts before the content of each individual information piece.

The method disclosed by "The Information Visualizer, An Information Workspace", S. K. Carol, G. G. Robertson and J. D. Mackinlay, Proc. ACM CHI '91, pp. 181–188 or the method of grasping the whole tendency of the group of information including pieces of information each of which is represented by a dot on a display screen through the user interface (UI) of "*CemeDot" (a coined word) disclosed by Japanese Patent Application Laid-Open No. Hei. 7-121565 (1995) correspond to this case. Taking an extensive view of a town from the top of a hill, confirming physical features of a town using a map, grasping the whole construction of a document from the table of contents, and so forth fall into this category.

The fourth type is a method called accessed viewing (a coined word) in which pieces of information show up themselves regardless of the subjectivity of a person.

In certain circumstances, electronic mail or TV news may fall into this category. A direct mail, circular notice, telephone call, and listening to the radio or watching the TV without paying attention are also examples of pieces of information showing up themselves. Neon or signboards greeting people's eyes while they are walking in the street, sounds of advertisement, a landscape from the train window which changes momentarily, and so on are also pieces of information showing up by themselves. Those pieces of information automatically come up to a person if only ears and eyes fulfill their functions and the person is in such a circumstance.

Actually, the above three methods require the precondition of a person's subjectivity; therefore, pieces of information do not appear until the person behaves with his/her will. The accessed viewing is contrary thereto, and there is far more information than in the cases of the first three methods.

Presently, the above four methods are all for viewing the pieces of information through information systems. However, in the relation between people and pieces of information in everyday life, there is a kind of relation which cannot be grasped by any of the above methods. It is a phenomenon that pieces of the background information appear in front of a user's eye when paying attention to a specific piece of information is completed or suspended. A phenomenon in contrast with this occurs, that is, if attention is paid to a specific piece of information, other pieces of information surrounding thereof withdraw to the background and become invisible. Such phenomena may be hardly apparent in everyday life because they are too fundamental.

These phenomena can be explained by a point of view suggested by Jean-Paul Sartre that, in a phenomenon, if we pay attention to a certain object, other things turn into its background, a concept proposed by Yoshikage Kei that only a certain object is consciously perceived, but other objects are also perceived subconsciously, and a concept named tacit knowing, mentioned by Michael Polanyi, that we can know more than we can tell, that is, we have a knowledge that we cannot tell.

The inventors of the present invention positively utilize the phenomena between people and groups of pieces of information to intervene in paying attention and releasing attention, and to support thereof. The inventors consider whether it is possible to improve the efficiency in information processing (informing whether there are items left unwritten which must be written in a document, or should be written in a document for making it more effective, making the user confirm whether there is any case to be dealt with on the telephone as a minor side issue, and so forth) or not in some cases, and in other cases, consider whether it is possible to support flexible thought (showing pieces of stimulating information for breaking the deadlock, promoting refreshing the user by himself/herself, and so on) or not.

So far computers have provided pieces of information to be paid attention to by people in various ways, but have not been concerned with their background. In the real human society, the background is fixed. However, computers can control the background dynamically. Therefore, by utilizing this capability, the inventors of the present invention consider whether it is possible to create a new method of viewing information for human beings by implementing the function of dynamically controlling pieces of information which are paid attention to and pieces of background information in a virtual world on computers.

The inventors of the present invention review the above new method of viewing information based on the relation between "focused" information and "peripheral" information related to the "focused" information (variously related from the various viewpoints, which is controlled by computers), and then provide the present invention.

The new method of viewing information is named "tacit viewing" by the inventors of the present invention as the fifth method of viewing which follows the above four methods. The tacit viewing method is discussed below.

Tacit viewing is the method in which a specific item is visible if it is currently paid attention to with outstanding concentration, and items in the background or periphery of the item paid attention to gradually appear as the degree of concentration declines. The case contrary thereto, that is where concentration on a specific item is gradually focused, is also tacit viewing. If the method is implemented in an information system, a piece of information is taken and read with a specific purpose (this piece of information is referred to as the focused data), and after an appropriate interval from representation of the focused data (of course, there are cases of no interval), pieces of information related to the focused data (these pieces of information are referred to as the peripheral data) are automatically determined and retrieved to be represented for supporting or supplementing resolution of problems in the focused data.

For realizing the tacit viewing, it is important to overcome the following technical problems when the focused data is determined, (1) how to determine the peripheral data;

(2) at what timing the peripheral data is represented;

(3) how to represent the peripheral data.

The reasons of importance are as follows. As to (1), there is an advantage of utilizing the computer power in its capability of variously controlling the determination of peripheral data based on any of various viewpoints of periphery. As to (2), if grasp of a more appropriate timing is not taken into consideration, the effect of the tacit viewing is decreased because a person pays attention to something and loosens up the attention in a specific time period. Further, as to (3), if the peripheral data can be determined in various ways, there is some fear that the relation between the focused data and the peripheral data is difficult to be understood; therefore it is necessary to contrive to represent the peripheral data so that the relation between the peripheral data and the focused data may be understood easily and immediately.

Next, the tacit viewing is explained in comparison with a conventionally known technique related to data outputting.

A system described in "Issues in the Design of Computer Support for Co-authoring and Commenting", C. M. Neuwirth, D. S. Kaufer, R. Chandhok and J. H. Morris, Proc. of CSCW '90, pp. 183–195 has a purpose of supporting the communication between the author and co-authors or referees in the process of preparing a document. The system recommends them to positively give their comments on the contents of the document and provides a function therefor. Specific examples are described in which the text is placed in the center of the screen, and comments of the co-authors and referees are written in the right and left sides of the text. By displaying both text and comments, an overall view of the data paid attention to and the data related thereto is improved.

However, in this system there are four unresolved problems that prevent realization of tacit viewing.

(1) In tacit viewing, the relation between the focused data and the peripheral data must be determined flexibly and variously. However, in the aforesaid system, the relation is fixedly and uniquely determined.

(2) A group of comments fixedly exists for the text. Therefore, it is impossible to designate one of the comments and regard it as the focused data, namely, the text.

(3) It is necessary that the relation between the pieces of data be designated by the user when the pieces of data are created. Therefore, the user is forced to have the burden of assigning relationships.

(4) In tacit viewing, the timing of representation of the peripheral data after representation of the focused data must be controlled, but there is no such mechanism in the aforementioned system.

Another system, described in "NoteCards in a Nutshell", F. G. Halasz, T. P. Moran, and R. H. Trigg, CHI+GI, 1987, regards icons corresponding to pieces of hypermedia data as nodes, and connects the nodes according to linkages among the pieces of data and displays them as if they constitute a network for viewing relation among the pieces of data in a database. Consequently, it becomes possible for the user to roughly grasp the contents of the database as a whole, as well as to grasp the position of the data to which the user's attention is currently directed in the whole database and what kinds of pieces of data exist around the data. If the user wants to pay attention to part of the data, that part can be expanded and displayed. The user can read the contents of the data by designating the icon corresponding thereto, which is a feature of a typical overview system.

However, with regard to the aforesaid system, another problem (problem (5)) for realizing the tacit viewing other than the above problems (1), (3) and (4) is described as follows, which is related to the overall view.

The data displayed as a node consists of an icon which is the abstraction of the data and a short sentence symbolizing the data, and therefore the user is unable to grasp the contents of the data. If the user wants to read the contents of the data, he/she is required to designate the display of the contents on another window. If the user wants to read the contents of the neighboring data, he/she is required to designate in the same way. This is not only to press a load to the user, but also to impede the simultaneous viewing of the contents of the data.

A system described in "Context and Orientation in Hypermedia Networks", K. Utting and N. Yankelovich, ACM Transactions on Information Systems, Vol. 7, No. 1, pp. 58–83, 1989 displays a database consisting of the hypermedia data as a network and provides three functions: "Global Map", "Local Map" and "Local Tracking Map". "Global Map" displays the whole database like a network, regarding the pieces of data as nodes for supporting the user in grasping the database as a whole. "Local Map" displays the local relation among the pieces of data in the "Global Map" by taking the node to which attention is paid and designated by the user and other nodes directly connected thereto by linkage, and locating the node designated by the user in the center and the group of nodes directly connected by linkage in the periphery of the designated data. The user can designate a piece of data in the group of pieces of data located in the periphery to be brought to the center as a new piece of data to which attention is paid. In "Local Tracking Map", it is possible to make the node to which attention is paid in the "Local Map" dynamically vary in accordance with the change of the node to which the user pays attention.

However, the above-described problems (1), (3), (4) and (5) are left unresolved; and therefore it is impossible to realize the tacit viewing.

In a browsing apparatus for the hypertext disclosed by Japanese Patent Application Laid-Open No. Hei. 4-321144 (1992), a database retaining the pieces of hypertext data is displayed as a tree structure starting with an arbitrary node and providing indents becoming gradually deeper to the lower nodes in order. An application example such that a symbol '−' is assigned to the top of a node if it is the lowest node of the tree structure (the node having no lower nodes), and a symbol '+' is assigned to the other nodes is also suggested.

However, in this system, the above-described problems (1), (3), (4) and (5) are left unresolved; therefore the tacit viewing cannot be realized.

As described so far, problems preventing realization of the tacit viewing cannot be resolved by the prior art, and in particular, problem (4), namely, incapability of control of the time of representation of the peripheral data is a difficult problem.

As a technique related to representation dealing with time controlling, the following system is known.

In a speech note preparation supporting system disclosed by Japanese Patent Application Laid-Open No. Hei. 8-147275 (1996), the time necessary for making a speech is calculated by extracting words from a note and consulting a reading time dictionary for each word to complete the speech within the time limit.

However, in the tacit viewing, the time necessary for understanding the focused data greatly varies according to various factors such that the data has been read in the past, or the like. For appropriately executing time control coping with the variation, it is insufficient to only calculate the time necessary for reading the speech note aloud, which is a one-sided action. Even though the technique is applied, the timing controlling mechanism in tacit viewing cannot be realized.

A presentation time estimation apparatus disclosed by Japanese Patent Application Laid-Open No. Hei. 2-7162 (1990) analyzes the presentation materials and calculates the amounts of information disclosure, and estimates the time necessary for making a presentation based thereon. It is discussed that, in this system, the time necessary for presentation is estimated basically according to a speed with which the audiences understand the presentation, and that the time is controlled in accordance with the degree of importance of items in the presentation.

However, in this system, if it is taken into consideration that the sending of information is the important purpose and the receivers (audiences) are not fixed but have variations, it cannot be expected that the past cases are directly regarded as important factors of time controlling. Further, since the language and terms to be used are determined in advance corresponding to the scene, they cannot be the factors of time controlling in the system.

As described above, it is impossible for the prior art related to time controlling to realize the requirements of tacit viewing. The reason is that the focused data subject to time control is not always sent by the user himself/herself, and it has unexpected variations from many viewpoints such as language, specialty, type of medium and so forth. It is also the reason that, though the degree of interest of the user should be taken into consideration, the prior art cannot conform to the conditions of the individual users (audiences). Furthermore, because tacit viewing is basically silent reading, namely, receiving of information, whether the data has been presented in the past or not greatly affects the time necessary for understanding the data. However, in the controlling technique chiefly dealing with transmission of information, such concept cannot be found.

In short, conventional time control is the controlling technique for dispatching; therefore it is difficult to derive a controlling technique therefrom for receiving such as the tacit viewing.

As described so far, in the prior art, if the peripheral data is going to be represented for realizing the tacit viewing, it has been impossible to estimate the time of representation of the peripheral data corresponding to the variations of language used in the focused data, specialty dealt with by the data, type of medium, user's interest or the like. Further, it has also been impossible to estimate the time of representation of the peripheral data based on the actual results of representation of the focused data in the past.

In other words, the prior art has been incapable of realizing the "function of controlling the timing of representation of the peripheral data as soon as the user's attention is released from the focused data (corresponding to problem (4))" among the functions indispensable for realization of the tacit viewing. More specifically, the function such that the time period necessary for the user to complete reading (grasping) the focused data can be calculated appropriately and flexibly corresponding to unexpected variations of the focused data has not been implemented.

SUMMARY OF THE INVENTION

The present invention has been made in view of the above circumstances and has an object to provide a data outputting system implementing the tacit viewing by representing peripheral data related to focused data to which the user pays attention at an appropriate timing.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims. To achieve the objects and in accordance with the purpose of the invention, as embodied and broadly described herein, a data outputting system of the present invention includes a storing element for storing pieces of data, a representation element for representing the pieces of data stored in the storing element, a focused data designating element for selecting a piece of data designated by a user as focused data from the pieces of data stored in the storing element, a focused data representation element for representing the focused data by the representation element, a peripheral data determining element for selecting some pieces of data as peripheral data from the pieces of data stored in the storing element in accordance with the degree of relation regarding the focused data, a representation timing determining element for determining timing of representation of the pieces of the peripheral data selected by the peripheral data determining element by the representation element in accordance with attributes of the focused data, and a peripheral data representation element for representing the pieces of the peripheral data selected by the peripheral data determining element by the representation element at the representation timing determined by the representation timing determining element.

Accordingly, the time period for completing reading of any given focused data is predicted based on the attributes of the focused data, and thereby the pieces of the peripheral data are represented to the user at the timing determined based thereon.

The focused data is the data to which the user pays attention. It is automatically represented by the system when the system is started, or selected by the user to be represented by the system so that it can be distinguished from others. The pieces of peripheral data are represented by the system to the user so that they can be distinguished from the focused data. The output or representation of data means the method of outputting corresponding to the kind of medium of the data. For example, text data or image data is displayed on a screen, while voice data is outputted by a speaker accompanied by a screen display indicating the voice data.

The attributes of the focused data include the kind of medium of the focused data such as text, still picture, motion picture, voice or the like. More specifically, there are detailed attributes that affect the time period for completing reading or understanding the focused data, for example, the number of characters or description language and so on in the case of the text data.

The storing element may be a database conducting centralized control of the data in a local server, or a set of components for retaining pieces of data distributed in a network, in which each component for retaining data can be of a different format. In short, it is sufficient if the storing element of the data outputting system according to the present invention is able to make the pieces of data to be used as the focused data and the peripheral data available.

If the focused data is the text data, the data outputting system according to the present invention particularly administers the user's reading capability in accordance with the kind of language as information used for determining the timing of representation by a language administration component. Also, it is possible to accept a request from the user by a timing designation obtaining component for changing the timing. Therefore, the timing determining element determines the timing of representation of the pieces of the peripheral data based on the kind of language describing the content of the focused data. If there is a request from the user in determining timing, the timing determining element changes the timing of representation complying with the user's request.

Accordingly, if the content of the focused data is described by a language relatively familiar to the user, the pieces of the peripheral data are represented at a timing which is relatively earlier. In contrast, if the content is described by an unfamiliar language, the pieces of the peripheral data are represented at a timing which is relatively later. In both cases, the pieces of the peripheral data are represented at an appropriate timing, namely, at the time when the user completes reading the focused data. The timing of representation can be changed corresponding to the reading capability of an individual user.

In another aspect of the data outputting system according to the present invention, the timing determining element determines the timing of representation of the pieces of the peripheral data based on the representation history of the focused data in the past. This is because, for the data that has been read many times in the past or the data that has been recently read, the time period for completing reading the data by the user becomes shorter in general. Therefore, the pieces of the peripheral data can be represented at an appropriate timing based on the representation history of the focused data in the past.

In another aspect of the data outputting system according to the present invention, the timing determining element determines the timing of representation of the pieces of the peripheral data in accordance with attributes of the user. Each individual user has various attributes such as sex, age, occupation, specialty, interest, hobby, and so on, and the time necessary for the user to read or understand the data is changed. Therefore, the pieces of the peripheral data can be represented at an appropriate timing based on the user's attributes.

In the data outputting system according to the present invention, it is possible to determine the timing of representation of the pieces of the peripheral data according to an arbitrary combination of any of the attributes of the focused data, the representation history of the focused data in the past, and the attributes of the user.

In another aspect of the data outputting system according to the present invention, the timing determining element randomly determines the timing of representation of the pieces of the peripheral data. In our daily life, if an unexpected matter happens to us, we are deeply impressed by the matter, or a new conception is generated from the matter in some cases. In this aspect, the pieces of the peripheral data are represented at a random timing that is impossible for the user to expect, namely, at an appropriate timing for acquiring such effects.

In another aspect of the data outputting system according to the present invention, a designation from the user for representing the pieces of the peripheral data is accepted by the representation designation obtaining component, and according thereto, the pieces of the peripheral data are represented regardless of the timing of representation determined by the timing determining element. That is, the pieces of the peripheral data are represented by the user's will.

In another aspect of the data outputting system according to the present invention, a history administering component administers the history of delay of timing of representation of the pieces of the peripheral data with respect to the focused data in the past. When the designation from the user for representing the pieces of the peripheral data is accepted, the pieces of the peripheral data are represented at a timing calculated by adding an average of the delays of timing in the history to the time of representation of the focused data.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings:

FIG. 8 shows the construction of a layout table of the first embodiment of the data outputting system according to the present invention;

FIG. 9 shows the construction of a timing table of the first embodiment of the data outputting system according to the present invention;

FIG. 20 shows a specific example of the focused data;

FIG. 21 shows a specific content of the timing table;

FIG. 22 shows a specific example of the peripheral data;

FIG. 24 shows a construction of a focused data history table of the second embodiment of the data outputting system according to the present invention;

FIG. 27 shows a construction of a focused data history table of the third embodiment of the data outputting system according to the present invention;

FIG. 34 shows a construction of a history table of the sixth embodiment of the data outputting system according to the present invention;

FIG. 37 shows a construction of a language list table of the seventh embodiment of the data outputting system according to the present invention;

DETAILED DESCRIPTION OF THE PREFERRED EMBODIMENTS

FIGS. 1 through 4 show an example of a screen display for discussing an outline of a data outputting system according to the present invention.

Figure 1:
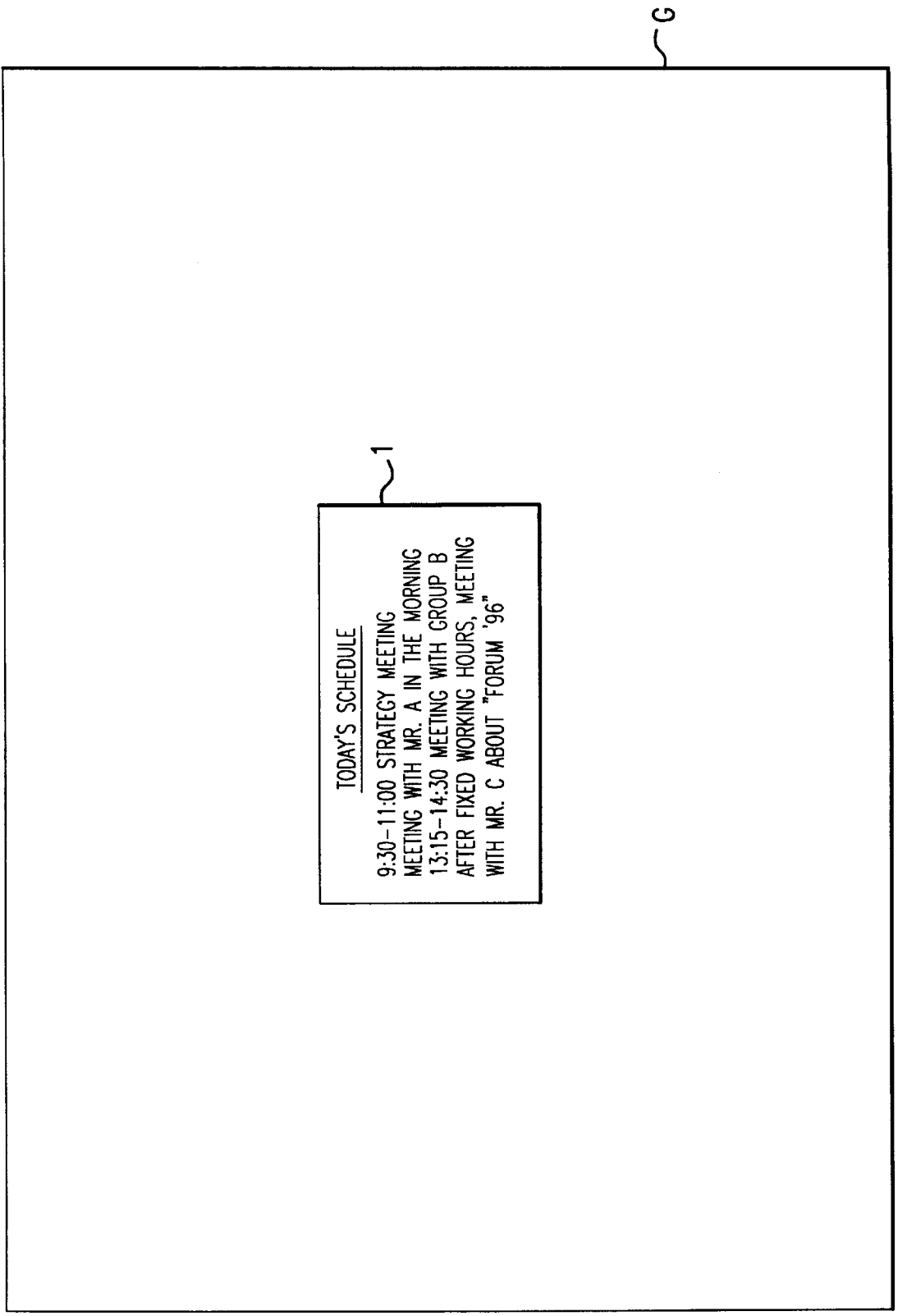
FIG. 1 is an example of screen display of focused data.
Figure 2:
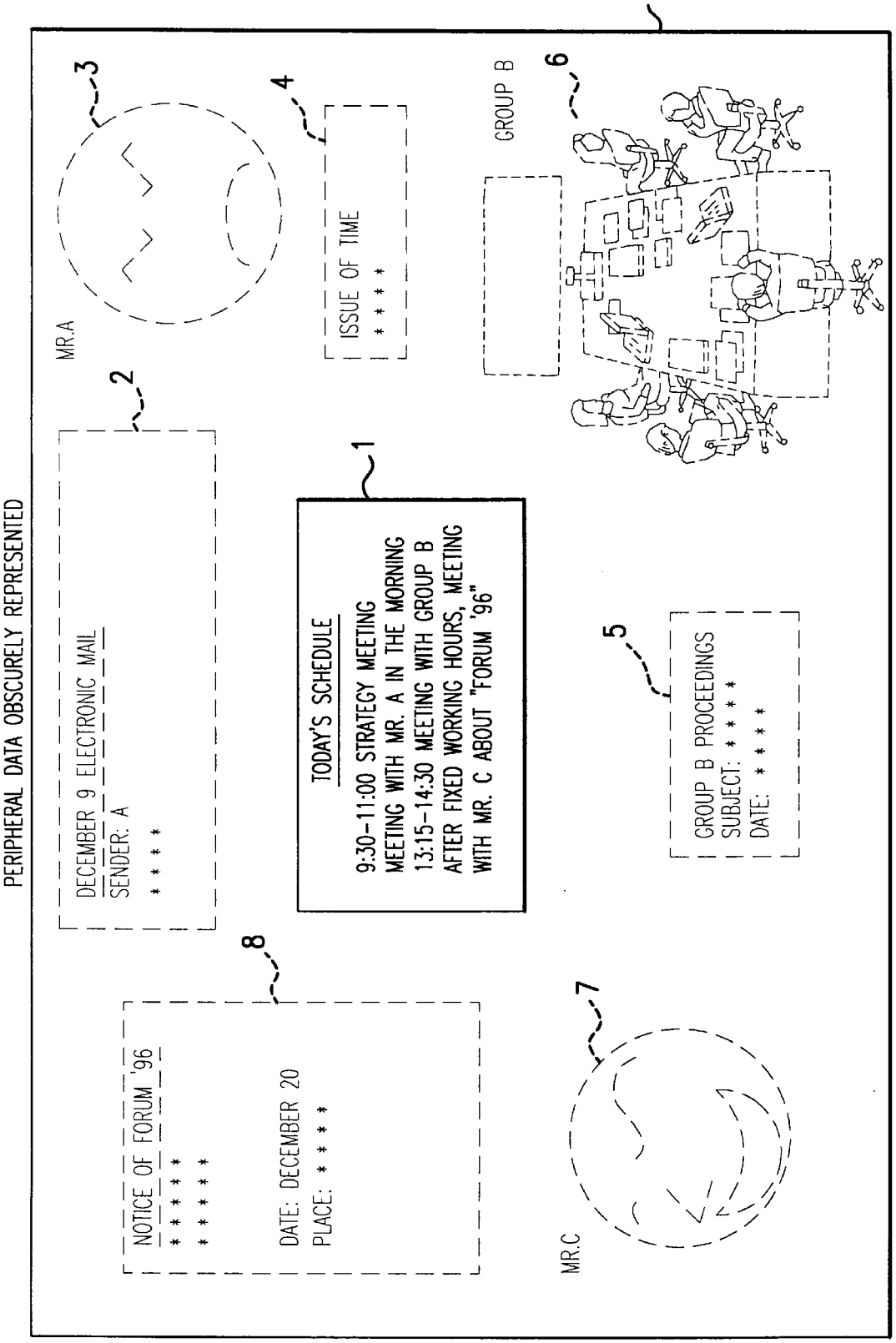
FIG. 2 is an example of peripheral data of the focused data obscurely displayed on the screen.

At first, as shown in FIG. 1, if a user designates "today's schedule" as focused data, data 1 of "today's schedule" is represented to the center portion of a screen G so that the user may recognize the data 1 as a point to which attention is currently paid by the user. Simultaneously, the system searches for peripheral data 2 through 8 related to the focused data 1, and a moment after representation of the focused data 1, obscurely represents them to the vicinities of the focused data 1 on the screen G as shown in FIG. 2. The peripheral data 2 through 8 are gradually rendered clear.

In this example, a text 2 of an electronic mail received today, a photograph 3 of Mr. A related to "today's schedule", a clipping 4 from a book about the time which the user has read before, proceedings 5 of a previous meeting with group B related to "today's schedule", a photograph 6 of group B, a photograph 7 of Mr. C also related to "today's schedule", and a notice 8 of "Forum '96", for which a previous arrangement is to be held today after fixed working hours are represented to the periphery of the focused data 1 as the peripheral data. Such representation of the focused data and the peripheral data enables the following way of using the data.

For example, sometimes the content of "today's schedule" 1 is changed according to the content of the text 2 of the electronic mail received today. Therefore, the user can easily confirm whether today's schedule is changed or not by seeing both schedule 1 and text 2.

Moreover, the photograph 3 of the person related to the schedule 1 helps the user to image the person. Thus the user is able to image Mr. A much clearer by seeing his photograph than by seeing only the name of Mr. A in the schedule. The photograph also clearly reminds the user of what was discussed with Mr. A in the previous meeting, and what is to be discussed today.

As to the previous arrangement for "Forum '96", the notice 8 clearly states when, where, by whom and so on, it will be held. Also, by reading the notice 8, the user can recall information such as the purport of the forum, participating members and so forth that are obtained when the notice is received though they are not stated in the notice 8. Thereby it is possible to help the thought of the user by clarifying items to be prepared for the previous arrangement and items to be confirmed in the arrangement.

In regard to the meeting with group B, the user is able to know about members constituting group B from the photograph 6 of group B represented as the peripheral data. The user can further see the proceedings of "Economy and Distribution" which was the topic of the previous meeting with group B, and thereby the user reminds himself/herself of the situation in the previous meeting and clarifies items to be discussed or to which attention should be paid in this meeting.

In association with the word "fixed working hours" mentioned in the last line of the schedule 1, the clipping 4 "Issue of Time" from a book-reading note is represented as the peripheral data. A casual word "hours" makes the user review the previous book-reading note which has already been forgotten, and get an opportunity to deeply consider "time". Thus the user can be made to "become aware" and make the best use of "time" in everyday life.

Representation of the peripheral data related to the focused data to which the user now pays attention stimulates the user and supports creative activities of the user.

Figure 4:
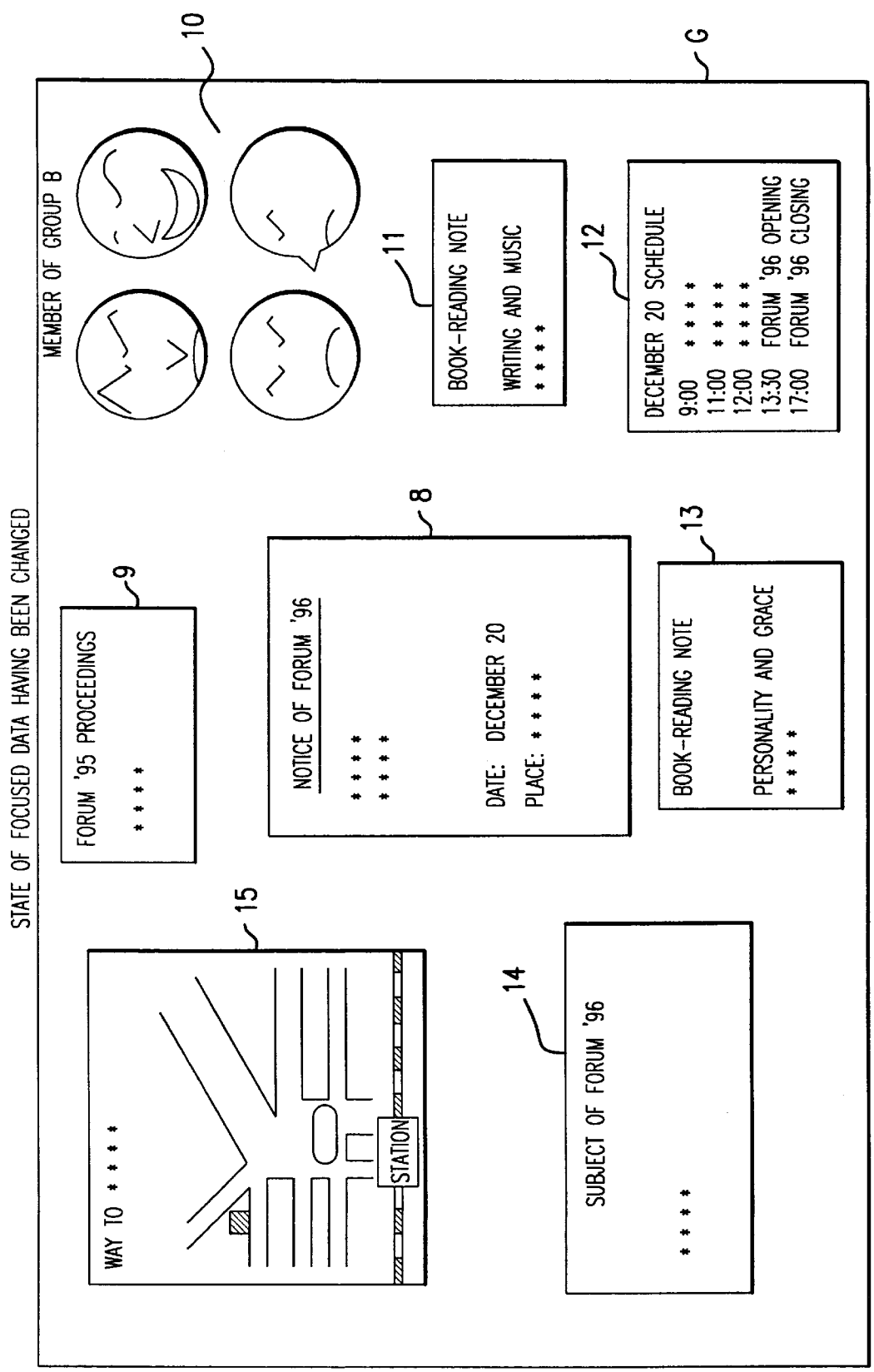
FIG. 4 is an example of the screen display in the case where the focused data is changed.

Next, if the user pays attention to the content of the "Notice of Forum '96", which is currently the peripheral data (that is, interest of the user transfers from "today's schedule" 1, which the user would like to confirm, to the notice "Forum '96"), the user designates the data 8 of "Notice of Forum '96" so that the data 8 may be represented as the focused data as shown in FIG. 4. Consequently, pieces of peripheral data 9 through 15 related to "Notice of Forum '96" are represented to the periphery of the new focused data 8. The pieces of peripheral data 9 through 15 help the user to understand the focused data "Notice of Forum '96", to hold a clear image, and to be stimulated by information almost forgotten.

By changing the data to which the user now pays attention (focused data), pieces of information related to the data are represented to the periphery of the data every time it is changed. Moreover, a piece of data represented to the periphery of the data to which attention is currently paid can be designated as a piece of data to which attention is paid next. These are the same ways of thinking in our everyday life, and help us with our thought process.

First Embodiment

Figure 5:
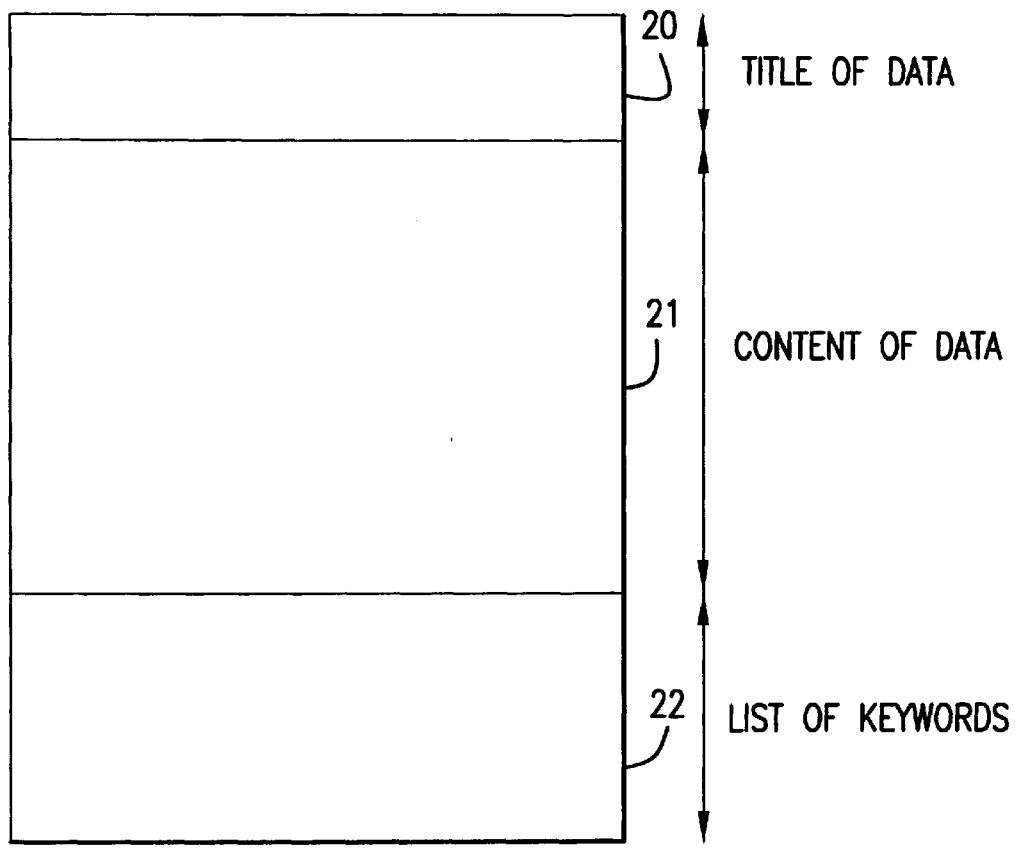
FIG. 5 shows a data structure related to a data outputting system according to the present invention.
Figure 6:
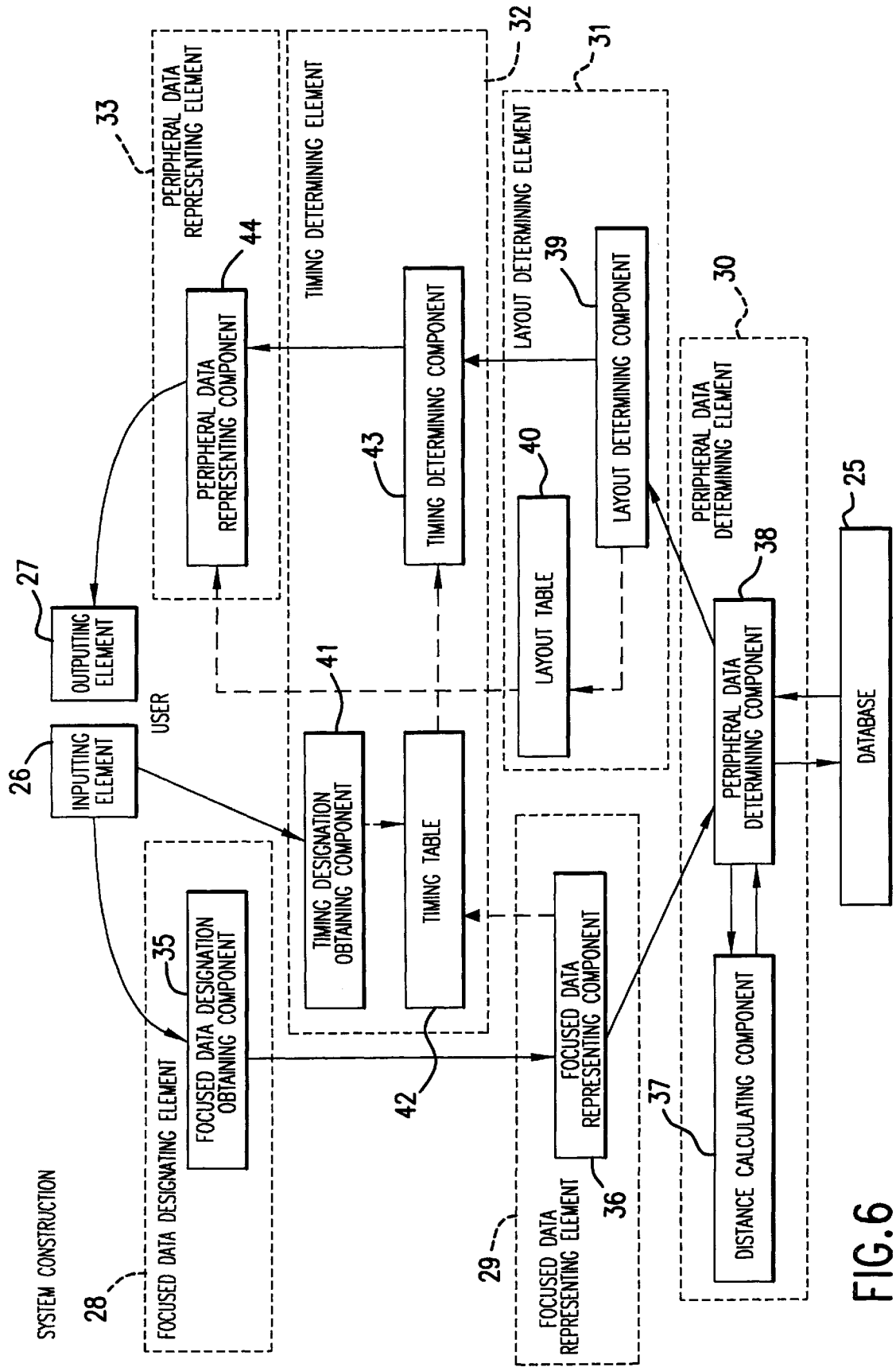
FIG. 6 shows a system construction of the first embodiment of the data outputting system according to the present invention.

FIG. 6 shows the construction of the first embodiment of a data outputting system according to the present invention. FIG. 5 shows a data structure used in the system. As shown in FIG. 5, the data structure used in the system includes a title 20 of the data, content 21 of the data and keywords 22 used to retrieve the data. It is not required to strictly constitute the data structure by the three fields, but it is sufficient if the equivalents of the title, content and keywords can be determined. For example, any field without direct relation can be allowed to be the constituent. Also, there may be instances where not all of the title, content and keywords are given from the beginning. For example, the keywords can be calculated in the other fields.

As shown in FIG. 6, the data outputting system includes a database 25 holding a large number of pieces of data with various media formats such as text, image and so forth, an inputting element 26 having a keyboard, pointing device and so forth, and an outputting element 27 having a display screen, speaker for voice outputting and so forth. The system also includes a focused data determining element 28 for receiving designation as to which of the pieces of data inputted through the inputting element 26 by the user is determined to be the focused data, a focused data representing element 29 for displaying or reproducing the focused data by the outputting element 27 according to the types of media, a peripheral data determining element 30 for determining the peripheral data related to the focused data based on the result of calculation, and a layout determining element 31 for determining where to locate the peripheral data on the display screen of the outputting element 27. Further, the system includes a timing determining element 32 for determining at what timing the pieces of the peripheral data are displayed or reproduced and a peripheral data representing element 33 for representing the pieces of peripheral data at the determined timing in accordance with the determined layout. The database 25 is not limited to a centralized control database on a local serve, but includes any construction capable of retrieving the various pieces of data distributed in a network.

The focused data determining element 28 has a designation obtaining component 35 for obtaining a designation as to which piece of data retained in the database 25 is determined to be the focused data when the system is started, and for receiving a designation of the focused data inputted through the inputting element 26 by the user after starting the system.

The focused data representing element 29 has a focused data representing component 36 for outputting the focused data on the display screen of the outputting element 27 if the focused data is text or a still picture, and reproducing and outputting the focused data by the speaker of the outputting element 27 if the focused data is voice data or a motion picture.

The peripheral data determining element 30 has a distance calculating component 37 for calculating the degree of relation between the pieces of data as a distance and a peripheral data determining component 38 for selecting 8 pieces of data located at the points of shorter distances from the focused data (namely, 8 pieces of data having higher relation degrees) from those stored in the database 25 and for determining them to be the peripheral data.

The layout determining element 31 has a layout determining component 39 for determining where to locate the pieces of the peripheral data and a layout table 40 for administering where to locate a piece of data on a display screen of the outputting element 27 for each piece of data.

A timing determining element 32 has a timing designation obtaining component 41 for obtaining a designation inputted through the inputting element 26 by the user as to how to determine the timing of representation of the peripheral data, a timing table 42 for administering time for representing the focused data, a timing determining method and its details, and a timing determining component 43 for determining at what timing the peripheral data is displayed or reproduced.

The peripheral data representing element 33 has a peripheral data representing component 44 for making the outputting element 27 represent the peripheral data to the user according to both the layout determined by the layout determining component 39 and timing of representation determined by the timing determining component 43.

In FIG. 6, it should be noted that the dotted arrow pointing to a table indicates writing data to the table and the dotted arrow coming from a table indicates reading data from the table.

In other words, the focused data designation obtaining component 35 receives designation from the user as to which piece of data is determined to be the focused data, and transfers the designated focused data to the focused data representing component 36. In the case where the piece of data to be processed has already been read out of the database 25, for example, while the system is operating, the data designated to be selected as the focused data is directly transferred to the focused data representing component 36. In contrast, if the piece of data designated to be selected as the focused data has not been read out of the database 25, for example, when the system has just been started, the focused data designation obtaining component 35 reads out the piece of data designated to be selected as the focused data from the database 25 and transfers the data to the focused data representing component 36.

Figure 7:
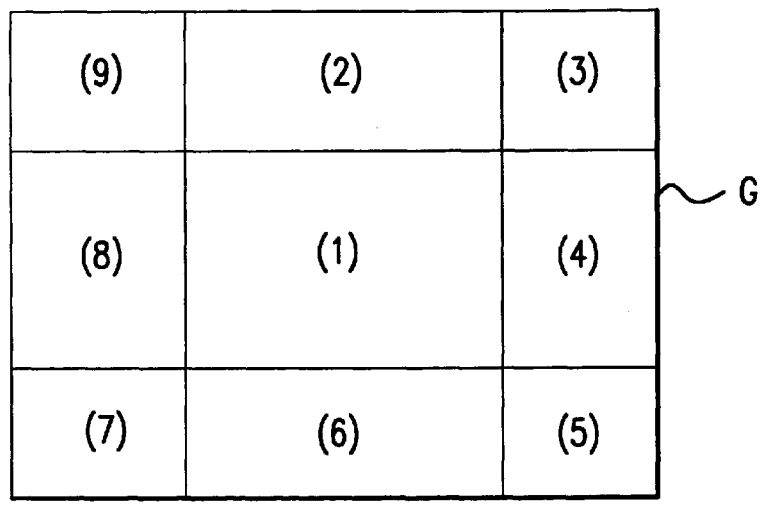
FIG. 7 illustrates division of the display screen into plural regions.

FIG. 7 shows the display screen divided into 9 regions (1) through (9). In the present embodiment, the focused data representing component 36 displays the focused data transferred from the focused data designation obtaining component 35 in the region (1) on the display screen G shown in FIG. 7. Moreover, the focused data representing component 36 describes the current time (namely, the time when the focused data is outputted to be displayed) in the timing table 42 as mentioned later, and in the case where the column of method of determining the timing in the timing table 42 is "prediction of time period for completing reading", stores the content of the focused data in the column of numerical information in the timing table 42.

The peripheral data determining component 38 selects 8 pieces of data from the database 25 located at the points of shorter distances from the focused data, and transfers them to the layout determining component 39 as the peripheral data. The calculation of distance is executed by the distance calculating component 37. The distance calculating component 37 receives a set of data from the peripheral data determining component 38, and then calculates the distances among the pieces of data and returns the result of the calculations to the peripheral data determining component 38. Details of the method of determining the distance are discussed later.

The layout determining component 39 receives the set of pieces of the peripheral data from the peripheral data determining component 38 and determines where to locate each of the pieces of data at random. Further, in each region in the layout table 40, the layout determining component 39 stores a pointer to the piece of the peripheral data to be displayed therein and transfers control to the timing determining component 43.

The layout table 40 is a means for administering where to locate each piece of data on the display screen provided to the outputting element 27. Specifically, the table 40 stores the numerical values (2) through (9) indicating the regions on the display and pointers to the pieces of data respectively displayed therein as shown in FIG. 8. The region (1) is excluded as a display region for the focused data.

The timing designation obtaining component 41 obtains information on which of the methods of determining timing is to be adopted through the inputting element 26 from the user. The user can select one of the "time period designation", "prediction of time period for completing reading" and "no-action time period designation" as the method of determining timing. Further, details of the selected method can be set. Receiving the designation from the user, the timing designation obtaining component 41 describes the method of determining timing and its details in the timing table 42.

The timing table 42 also has three items "time of representation of focused data", "method of determining timing" for representing the peripheral data and "numerical information" which is detailed information about the method of determining timing as shown in FIG. 9. If the method of determining timing is "time period designation" or "no-action time period designation", "numerical information" means waiting time from representation of the focused data or the last key operation to representation of the peripheral data. If the method of determining timing is "prediction of time period for completing reading", the "numerical information" means the content of the focused data.

The timing determining component 43 determines at what timing the peripheral data is displayed or reproduced according to one of the methods of determining timing held in the timing table 42. If the method of determining timing is "time period designation", the process of representing the peripheral data is not performed until the time period explicitly designated by the user has been passed after the focused data was represented. If the method of determining timing is the "prediction of time period for completing reading", the time required for the user to complete reading is predicted, and the process of representing the peripheral data is executed after the focused data was represented and subsequently the predicted time has passed. In the case of "no-action time period designation", pieces of the peripheral data are represented after the focused data was represented and the time period designated by the user has passed since the last inputting operation through the inputting element 26 (a mouse, keyboard or the like) by the user was performed.

The peripheral data representing component 44 reads the layout table 40 and displays the data corresponding to each region in accordance with the layout of the display shown in FIG. 7 and the timing determined by the timing determining component 43. The peripheral data representing component 44 does not represent the peripheral data until the timing of representation determined by the timing determining component 43 occurs, even though preparation for representing the peripheral data has already been completed. To the contrary, if the timing of representation determined by the timing determining component 43 has already passed when the preparation for representing the peripheral data is completed, the process of representing the peripheral data is started immediately.

Next, the process of representing the focused data and the peripheral data executed by the data outputting system is described. First to be disclosed is, how the data outputting system of the present embodiment is started.

Figure 10:
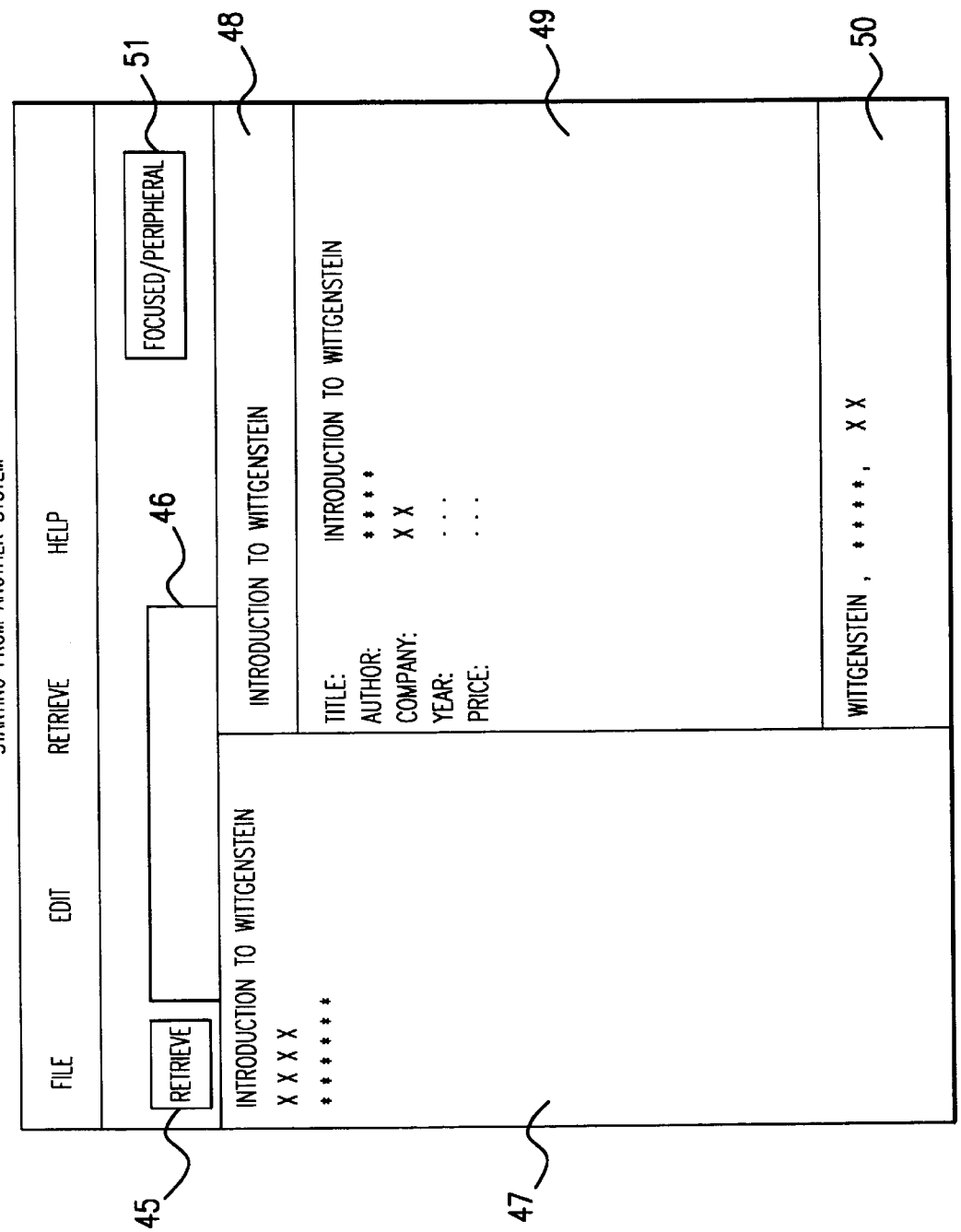
FIG. 10 is an example of the screen display for illustrating a retrieving system.

FIG. 10 shows a retrieving system which retrieves data stored in a database and presents the result to the user, which is constructed as a different system separately from the data outputting system related to the present embodiment. Because the data retrieved by this retrieving system is dealt with by the data outputting system as the focused data, the object of the retrieving system is the set of content of data, keywords used for retrieval and a title having a role of identifier symbolizing the data the same as that of the present embodiment of the data outputting system.

In this retrieving system, a character string is inputted to the window 46 on the right of the retrieval button 45 displayed on the display screen and the retrieval button 45 is clicked. Then the data including the inputted character string as the keyword is retrieved and a list of titles of the data 47 is displayed. In the example shown in FIG. 10, the titles of retrieved data are displayed as "An Introduction to Wittgenstein", "XXXX", and so forth.

By clicking one of the titles displayed in the list 47, the title of the data 48, information 49 such as the name of the author or the like, and a keyword list 50 are displayed. In the example shown in the figure, "An Introduction to Wittgenstein" is selected, thereby the title, information such as author's name and a keyword list are displayed.

A "focused/peripheral" button 51 is located at the top right portion of the display screen and functions for starting the data outputting system related to the present embodiment. The button 51 is effective only in the state where a specific piece of data is selected as shown in FIG. 10. Otherwise, even though the button 51 is clicked, the data outputting system is not started.

If the button 51 is clicked in the effective state, the data whose content is displayed in the system shown in FIG. 10 is transferred as the focused data to the focused data designation obtaining component 35 and the data outputting system related to the present embodiment is started. Here, the focused data is "An Introduction to Wittgenstein" currently selected in the system shown in FIG. 10, and the peripheral data to be outputted is determined by the data outputting system.

Thus the data outputting system is started and then tacit viewing is performed for the focused data and the peripheral data thereof. After the system is started, it is possible for the user to designate the method of determining timing for determining at what timing the peripheral data should be represented after the focused data is represented.

Figure 11:
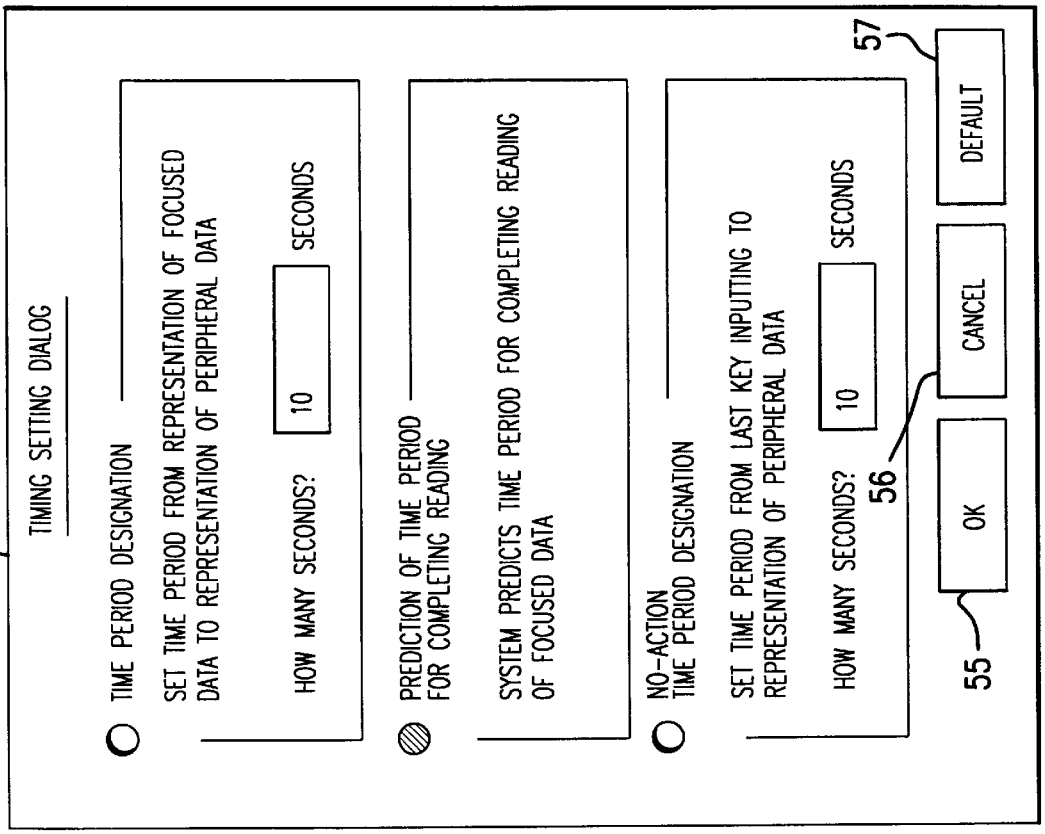
FIG. 11 shows a user interface of a timing designation obtaining component in the first embodiment of the data outputting system according to the present invention.

That is, a user interface (UI) as shown in FIG. 11 is displayed in the display screen of the outputting element 27. Therefore, the user can input a designation by operating the inputting element 26 through the UI. The timing designation obtaining component 41 obtains the designation from the user through the UI and submits instructions to the timing table 42 according to the designation.

More specifically, if the user starts the user setting menu of the data outputting system, some of items 53 are displayed. Among them, if the item "display timing setting" is selected, a timing setting dialog 54 is displayed. In the dialog 54, the items for the methods of determining timing ("time period designation", "prediction of time period for completing reading" and "no-action time period designation") are disposed, and the user can select one of them.

The selection is carried out by checking the circle at the top of one of the three items. If one of the items is selected, any of the other items cannot be selected simultaneously. For the selected item, details can also be set. In the example shown in FIG. 11, "prediction of time period for completing reading" is currently selected. That is, the circle at the top of the item is checked and changed into black. The details cannot be set for "prediction of time period for completing reading".

Below the timing setting dialog 54, three buttons, "OK" 55, "Cancel" 56 and "Default" 57, are disposed. The button "OK" 55 is used for designating that the user agrees to the content set by the timing setting dialog 54. The button "Cancel" 56 is used for designating that the content set by the timing setting dialog 54 should be canceled. The button "Default" 57 is used for designating that the content set by the timing setting dialog 54 should be returned to the default. In the present embodiment, "prediction of time period for completing reading" is the default.

Figure 12:
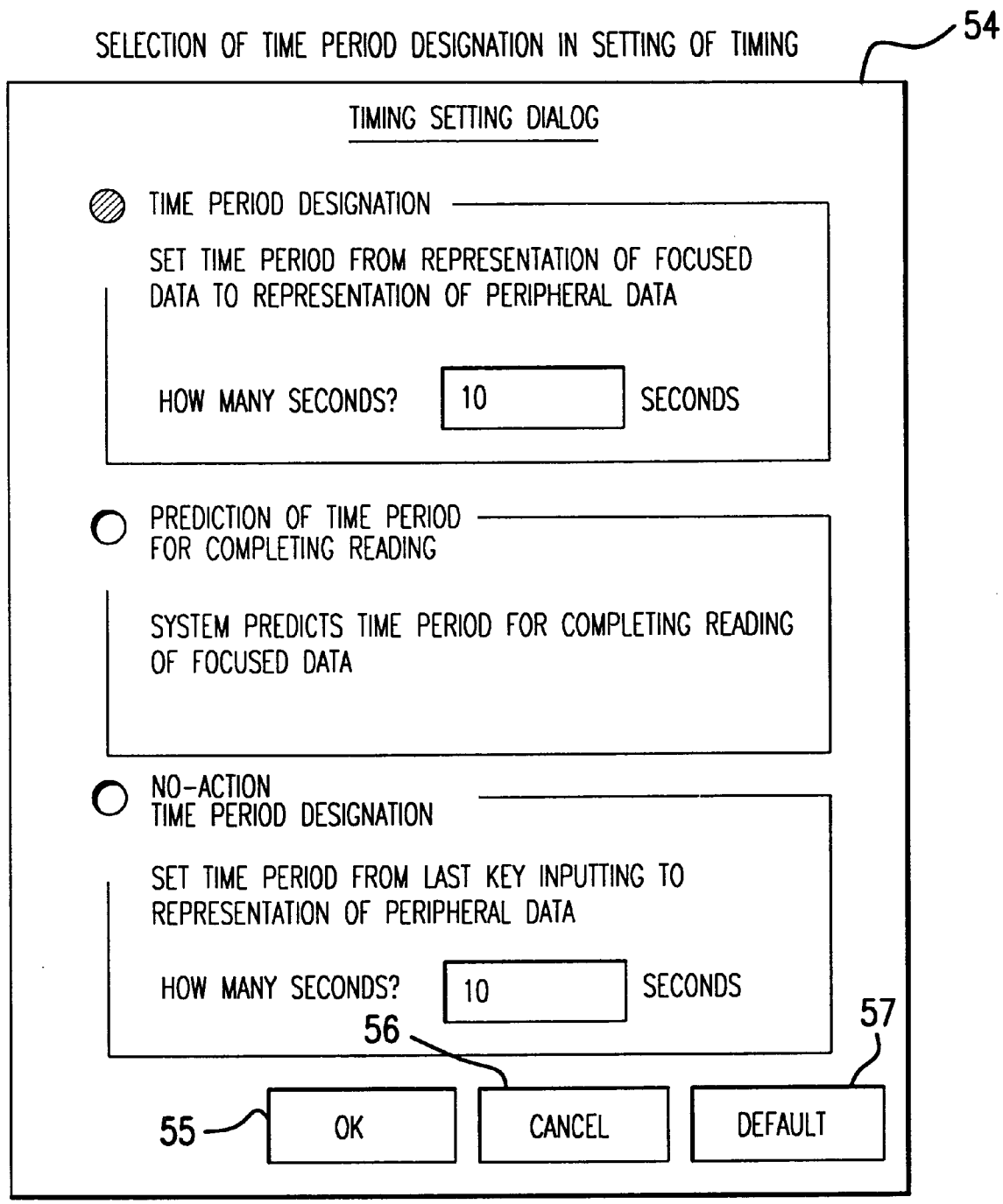
FIG. 12 shows an example of a timing setting dialog in the first embodiment of the data outputting system according to the present invention.

FIG. 12 shows the case where "time period designation" is selected by the timing setting dialog 54.

The circle at the top of the item "time period designation" is checked, thereby the circle is changed into black and the other two circles are white. Here, as a detail, it is possible to designate a time period from representation of the focused data to representation of the peripheral data, and currently, it is set to 10 seconds. If "zero" is set for "time period designation", the peripheral data is represented simultaneously with the focused data. In contrast, if "infinity" is set for "time period designation", only the focused data is represented and the peripheral data is not represented.

Figure 13:
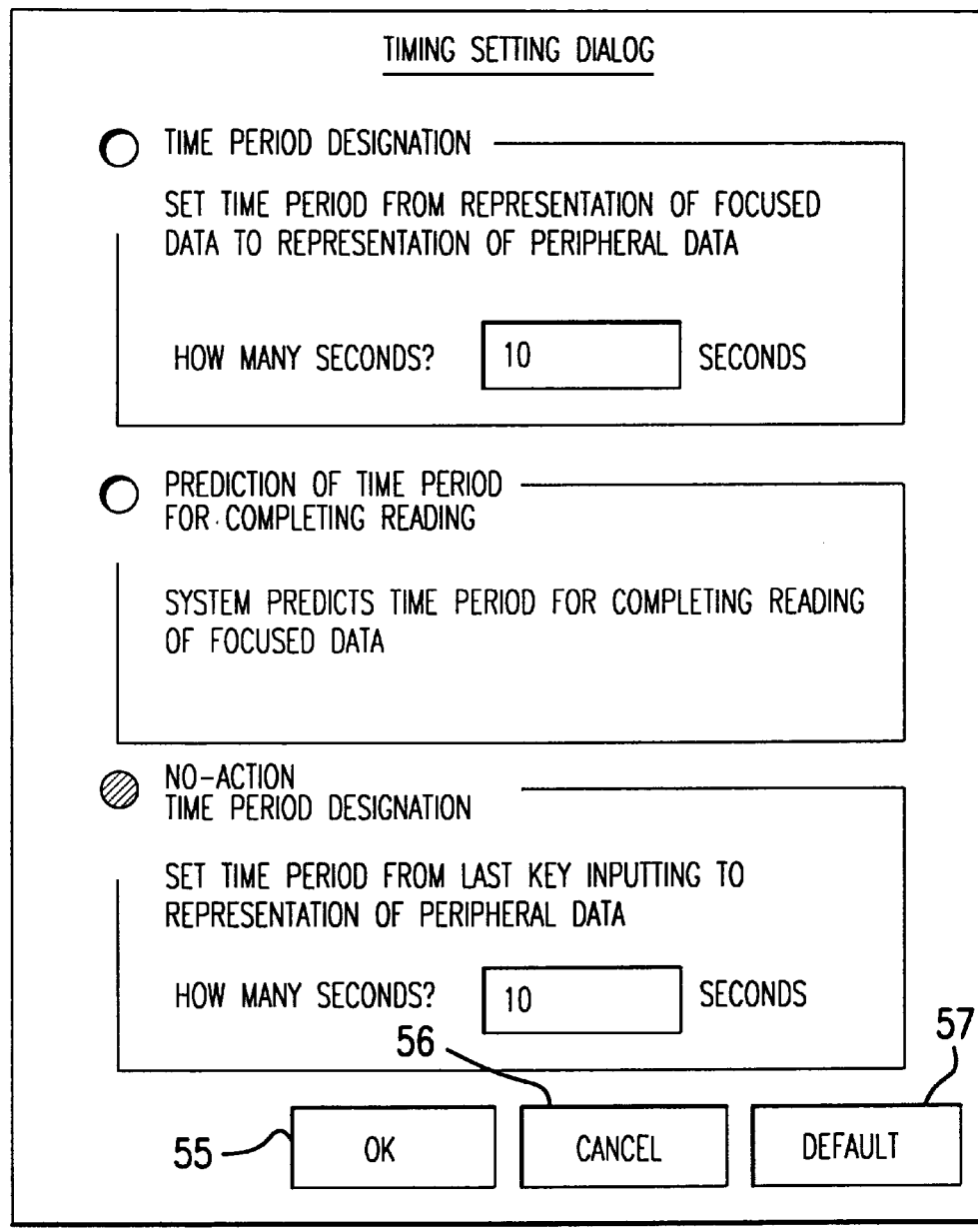
FIG. 13 shows another example of the timing setting dialog in the first embodiment of the data outputting system according to the present invention.

FIG. 13 shows the case where "no-action time period designation" is selected by the timing setting dialog 54.

By checking the circle at the top of the item "no-action time period designation", the circle is changed into black and the other circles are white. Here, as a detail, it is possible to designate a time period from representation of the focused data to representation of the peripheral data, all the while the user does not execute any operation or input, and currently it is set to 10 seconds.

The timing designation obtaining component 41 describes timing information (the method of determining timing and its details) obtained in the above way in the corresponding column of the timing table 42.

Figure 14:
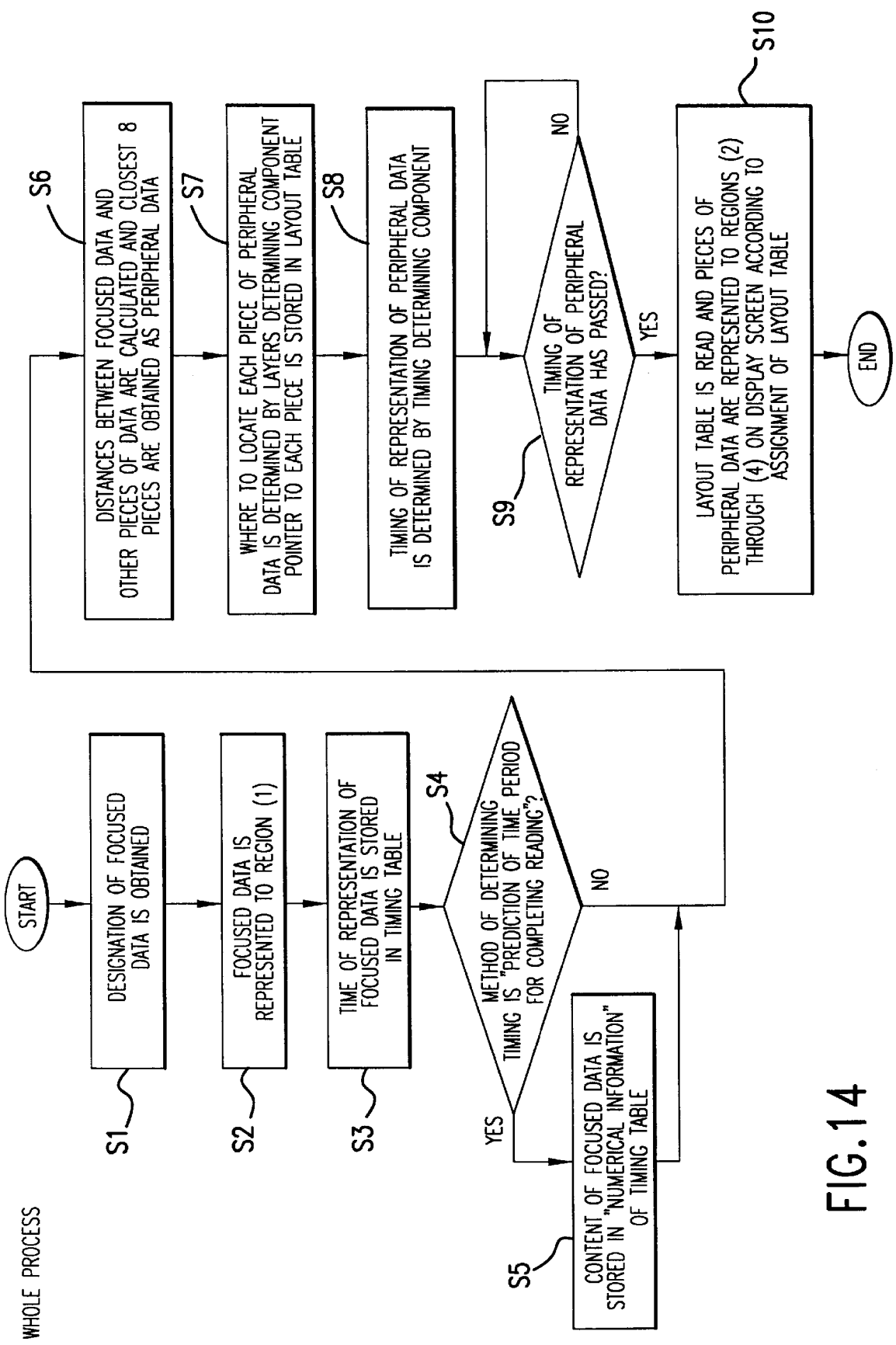
FIG. 14 is a flow chart showing procedures of the whole process of the first embodiment of the data outputting system according to the present invention.

Next, the process during the period from user's designation of the focused data to representation of the focused data and the peripheral data is explained with reference to FIG. 14.

At first, the focused data designation obtaining component 35 obtains the designation from the user (step 1). The designation is given by clicking the "focused/peripheral" button 51 of the retrieving system shown in FIG. 10 or clicking on any of the peripheral data in the present system for changing one of the pieces of the current peripheral data to the focused data. In the former case, the data whose content is currently displayed in the retrieving system is the focused data. In the latter case, a clicked piece of the peripheral data is changed to the focused data. Subsequent processes are the same in both cases.

The focused data designation obtaining component 35 transfers the focused data which has been thus designated to the focused data representing component 36.

The focused data representing component 36 represents the focused data transferred from the focused data designation obtaining component 35 to the region (1) shown in FIG. 7 by the outputting element 27 (step 2).

If the content of the focused data is text data, the content is displayed on the display screen. In the case where the content is too large to be put in the region (1), the content is displayed by utilizing the scrolling function. If the focused data is a still picture and the content is too large to be put in the region (1), the image is reduced to fit the region and be displayed. If the focused data is a motion picture and the content is too large to be put in the region (1), the successive image is reduced as a whole and reproduced. If the focused data is voice data, information indicating the voice data is displayed in the region (1) and the voice data is reproduced by the speaker.

The focused data representing component 36 describes the present time in the column of "time of representation of focused data" in the timing table 42 (step 3), and moreover, if the column of the "method of determining timing" of the timing table 42 is "prediction of time period for completing reading", the focused data representing component 36 stores the content of the focused data in the column of the "numerical information" of the timing table 42 (steps 4 and 5), and then transfers the focused data to the peripheral data determining component 38.

The peripheral data determining component 38 requests the distance calculating component 37 to calculate the distance between the focused data and each of the data other than the focused data in the database 25. By the request, the distance calculating component 37 calculates the distance for every piece of data. Based on the result of the calculations, the peripheral data determining component 38 selects 8 pieces of data which are closest to the focused data and designates them as the peripheral data (step 6), and transfers the pieces of peripheral data to the layout determining component 39.

In the present embodiment, if there are plural pieces of data corresponding to the eighth descending order of the distance to the focused data, a piece of data is randomly selected so that the number of the selected pieces of data will be 8 in total. On receiving a pair of two pieces of data from the peripheral data determining component 38, the distance calculating component 37 calculates the distance between those two pieces of data, as described in detail later on, and returns the result of the calculation to the peripheral data determining component 38.

The layout determining component 39 randomly determines where to locate each piece of data for the set of the pieces of peripheral data transferred from the peripheral data determining component 38 as described later with reference to FIG. 15. Then, in each of the regions (2) through (9) in the layout table 40, the layout determining component 39 stores the pointer to the piece of the peripheral data displayed therein (step 7) and transfers the control to the timing determining component 43.

The timing determining component 43 reads the method of determining timing from the timing table 42, and in accordance with the method, determines the timing of representing data as later described in detail (step 8).

When the timing determined by the timing determining component 43 (step 9) comes around, the peripheral data representing component 44 reads the layout table 40, and in accordance with the assignment of regions for display shown in FIG. 7, represents the piece of data corresponding to each of regions (2) through (9) on the display screen (step 10).

As is the case with the focused data, if the content of the peripheral data is the text data, it is displayed, and in the case where the content is too large to be displayed within the designated data, it is displayed by utilizing the scrolling function. If the content of the peripheral data is a still picture and it is too large to be displayed within the designated region, the data is reduced to be displayed within the region. In the case where the content of the peripheral data is a motion picture and it is too large to be displayed within the designated region, the whole successive image is reduced and reproduced to be displayed. If the peripheral data is voice data, information indicating voice data is displayed in the designated region and the voice data is reproduced.

Figure 16:
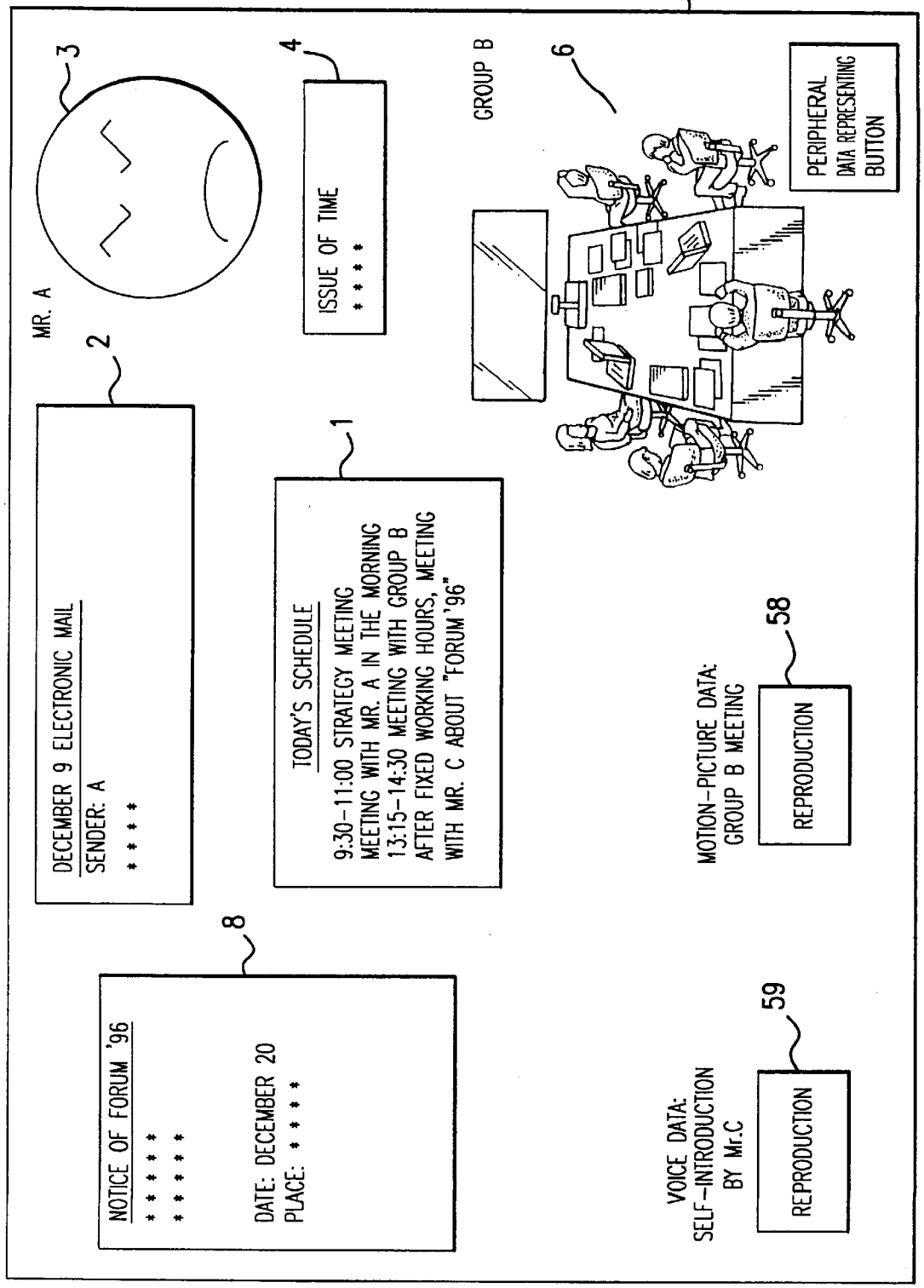
FIG. 16 is an example of screen display making preparation for representing a voice or motion picture in the first embodiment of the data outputting system according to the present invention.

As shown in FIG. 16, if the peripheral data is a motion picture, a button 58 for starting to reproduce the motion picture is displayed, and information indicating the motion picture is displayed in the corresponding region on the display screen G; thereby reproduction of the motion picture may be started by the user clicking the button 58. Consequently, it is possible to prevent the reproduction of the motion picture unintentionally according to the timing determined by the system without the user knowing it.

Figure 3:
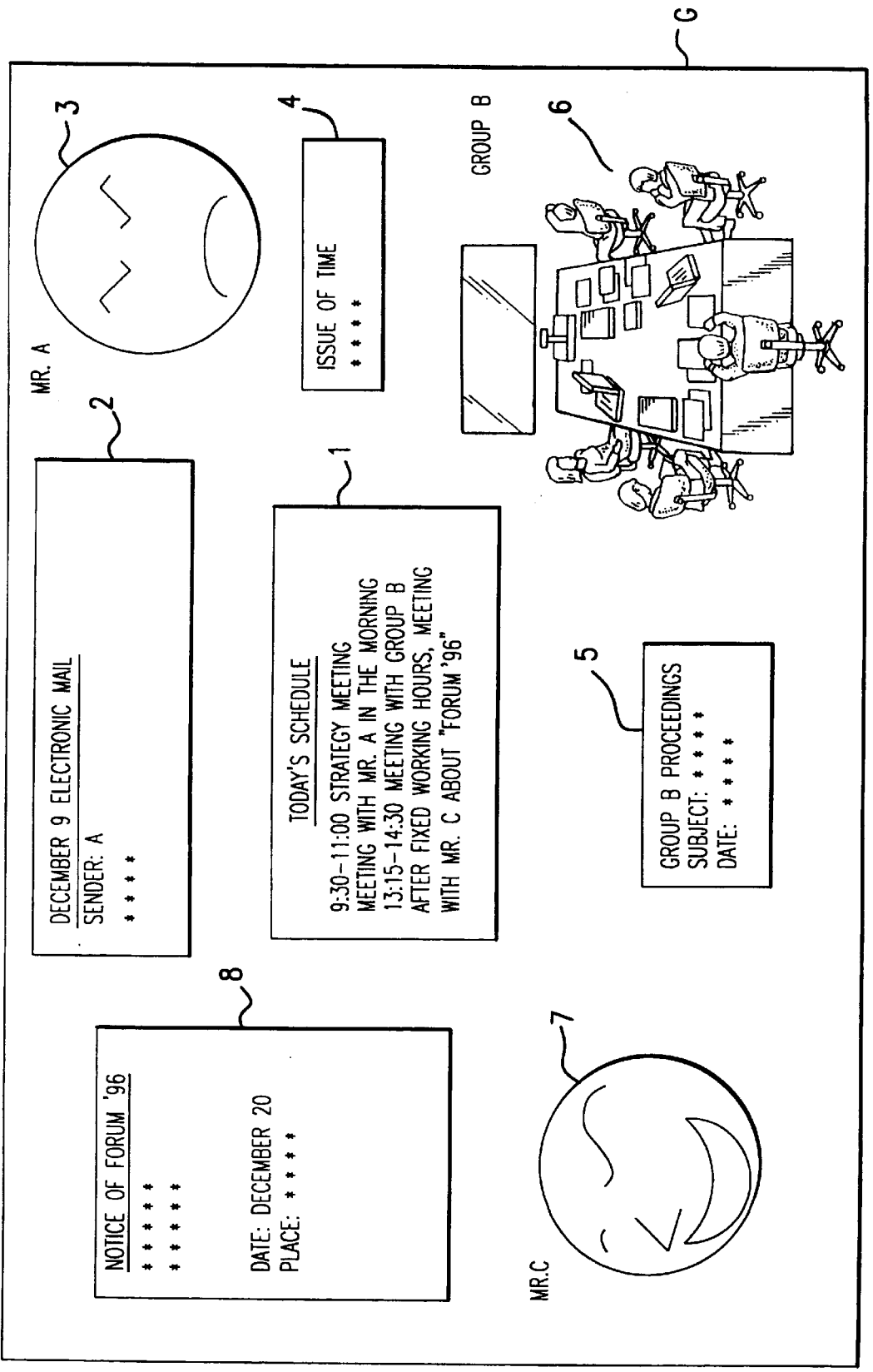
FIG. 3 is an example of the peripheral data of the focused data clearly displayed on the screen.

As in FIG. 3, the focused data is indicated by 1 and the pieces of the peripheral data are indicated by 2 through 9 in FIG. 16. Moreover, it becomes possible to change the timing of representation of the peripheral data by operating a peripheral data representing button 60 disposed at the bottom right of the display screen G as described in detail in the following embodiment.

In the case where the peripheral data is voice data, a button 59 for starting to reproduce the voice is disposed, and the information indicating the voice data is displayed in the corresponding region; thereby the reproduction of the voice data may be started by the user clicking button 59.

Further, if a display as described above is executed, the title of each piece of data can be added to the displayed information "motion picture" or the like for identifying the content of the motion picture data or voice data. In the case where there are plural pieces of motion picture data or voice data as the peripheral data, they are differentiated by adding the title of each piece of data to the displayed information.

Figure 15:
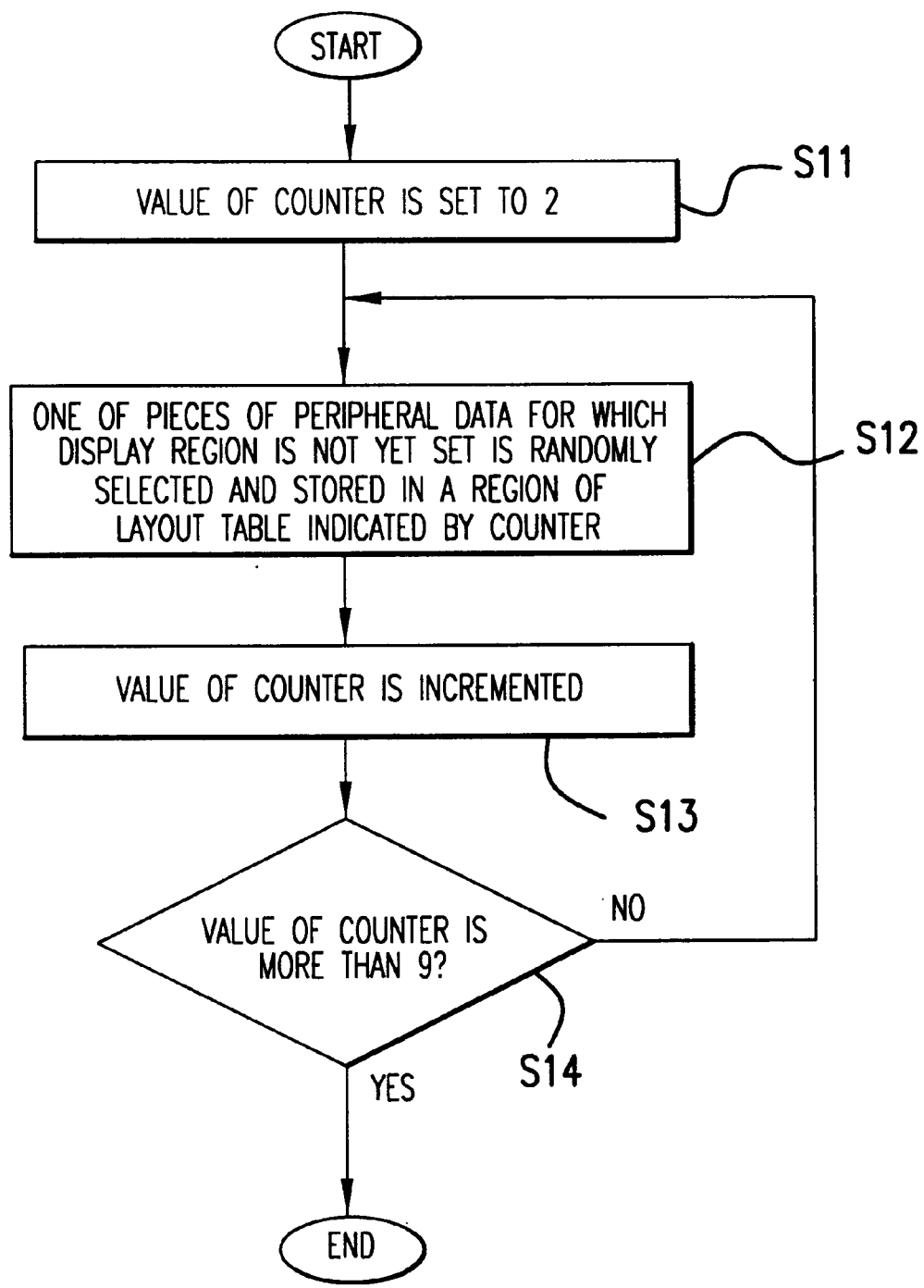
FIG. 15 is a flow chart showing procedures of a layout determining process of the first embodiment of the data outputting system according to the present invention.

The above-described process of the layout determining component 39 (step 7) is conducted in accordance with the procedures shown in FIG. 15. At first, the counter for designating the number of any of regions (2) through (9) is set to the initial value 2 (step 11). Then one of the pieces of peripheral data for which the display region is not yet set is selected at random, and the selected piece of peripheral data is stored in the region of the layout table 40 indicated by the counter (step 12).

The value of the counter is incremented and the process proceeds to the next region (step 13), and the operation described above is repeated until the value of the counter reaches 9 and all of the regions (2 are filled with the pieces of peripheral data (step 14).

Now, the above-described method of calculation of the distance between the pieces of data is discussed in detail.

In the present embodiment, the degree of relation between the pieces of data x and data y, namely, r(x, y) is defined as follows:

$$r(x,y)=P+T(x,y),$$

wherein P is the number of words which are the keywords of both data x and data y, and T(x, y) is a function linearly decreasing according to the difference between x and y. T(x, y) is a function that becomes 2 if the difference between the time points of creation of data x and creation of data y is within 1 hour, that becomes 1 if the difference is more than 1 hour and within a day, and that becomes 0 if the difference is more than a day.

The distance between data x and data y, namely, d(x, y) is defined as the reciprocal of r(x, y) as follows:

$$d(x,y)=1/r(x,y).$$

In short, in the present embodiment, it is assumed that the pieces of data having the same keywords have a high degree of relation with each other, and that the pieces of data having close time points of creation have a high degree of relation with each other.

Figure 17:
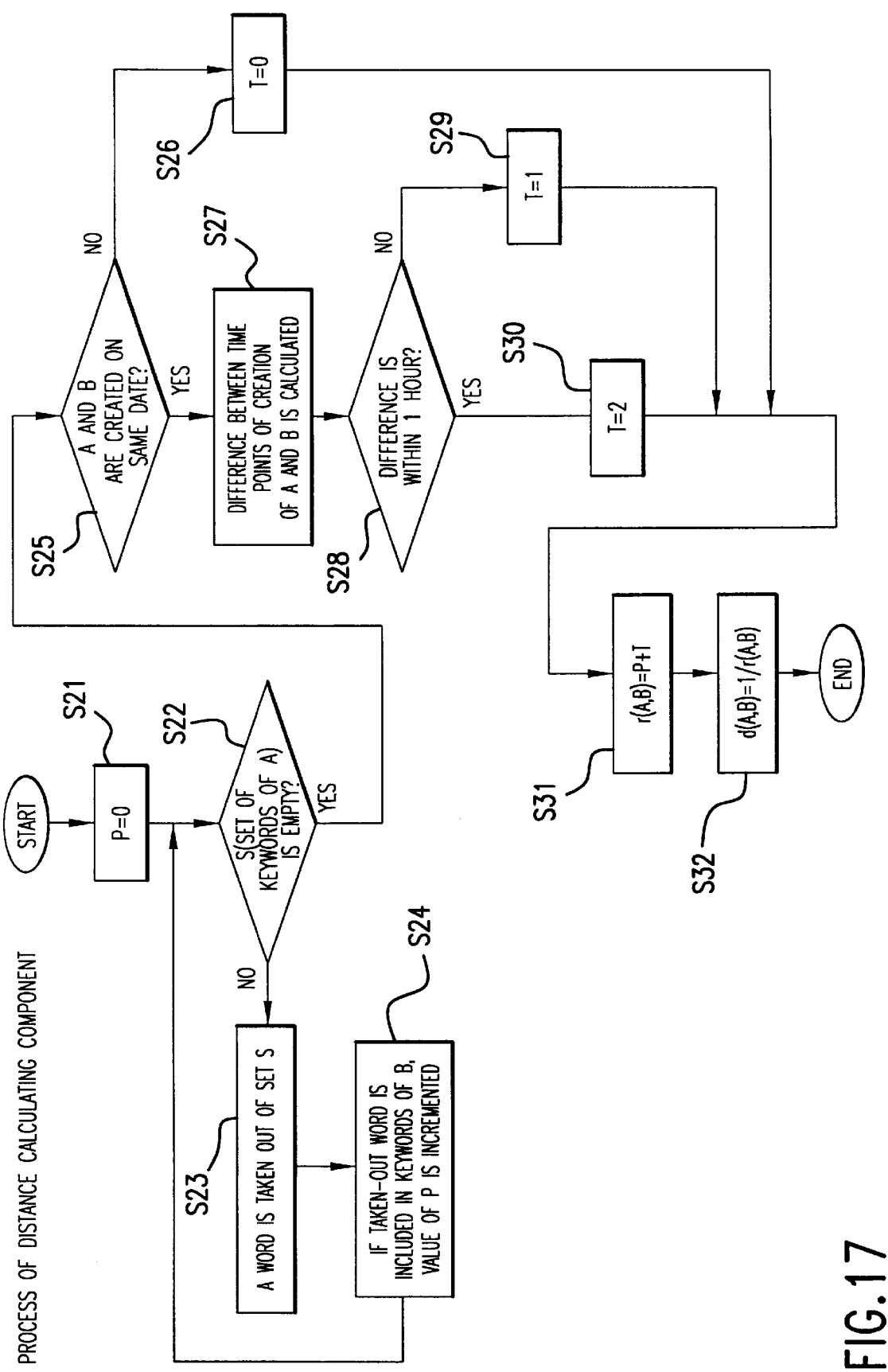
FIG. 17 is a flow chart showing procedures of a distance calculating process of the first embodiment of the data outputting system according to the present invention.

FIG. 17 shows the procedures of the process for calculating the distance between the focused data A and a piece of the peripheral data B by the distance calculating component 37.

At first, the above-described value P is initialized to be 0 (step 21). Then, until the set S of the keywords of the focused data A becomes empty (step 22), the words (keywords) are taken out one by one (step 23). It is checked whether the selected word is included in the set of keywords of the peripheral data B or not, and if it is included, the value of P is incremented (step 24).

Next, the value of T is calculated and it is checked whether the focused data A and the peripheral data B are created on the same date or not (step 25), and if they are not created on the same date, the value of T becomes 0 (step 26).

If they are created on the same date, the difference between the time points of creation of the focused data A and the peripheral data B is calculated (step 27) and whether it is within 1 hour or not is checked (step 28). As a result, if the difference exceeds 1 hour, the value of T becomes 1 (step 29), and if the difference is within 1 hour, the value of T becomes 2 (step 30).

Then the degree of relation r(x, y) is obtained by adding the values of P and T calculated as described above (step 31), and by obtaining the reciprocal of the degree of relation r(x, y), the distance between the focused data A and the peripheral data B, namely, d(x, y) is acquired (step 32).

The process of determining timing described above by the timing determining component 43 is explained with reference to FIGS. 18 and 19. It should be noted that the present embodiment adopts the process of determining timing in the case of utilizing the number of characters describing the focused data for calculating the predicted time period for completing reading of the data.

The process of determining timing for representing the peripheral data in the present embodiment changes its behavior according to the method of determining timing designated by the user, and further changes its behavior according to the type of medium of the focused data. That is, in the case of motion picture data or voice data, the time period for reproducing the data is set as the predicted time period for completing reading. In the case of a still picture, a 5-second period is set as an appropriate time period based on the assumption that it does not take much time to grasp the still picture. In the case of text data, the time period is determined in proportion to the number of characters. In the case of the text data including foreign characters, the time period is determined with lower proportion to the number of characters for the part of foreign characters on the assumption that reading speed is lower for foreign characters than for characters of the user's native language.

At first, the timing determining component 43 reads the time of representing the focused data from the timing table 42 and sets the time to the value C (step 41). Then the timing determining component 43 reads the method of determining timing from the timing table 42 (step 42) and checks whether the method of determining timing is "time period designation" or not (step 43) for conducting a distinction according to the kind of method of determining timing.

As a result, the timing determining component 43 also reads the numerical information (detailed information) from the timing table 42 in the case where the method of determining timing is "time period designation" (step 44). As described above, the numerical information is the waiting time L from representation of the focused data to representation of the peripheral data. The time of representing the peripheral data (timing of representation) is determined to be C+L (step 45).

In the case where the method of determining timing is not "time period designation", it is confirmed whether the method of determining timing is "no-action time period designation" or not (step 46), and if it is "no-action time period designation", the timing determining component 43 also reads the numerical information from the timing table 42 (step 47). As described above, this numerical information is the waiting time L from the last inputting operation by the user after representation of the focused data to representation of the peripheral data. The time of representation of the peripheral data (timing of representation) is determined to be the time point after L seconds have passed since the last inputting operation was conducted (step 48).

Figure 19:
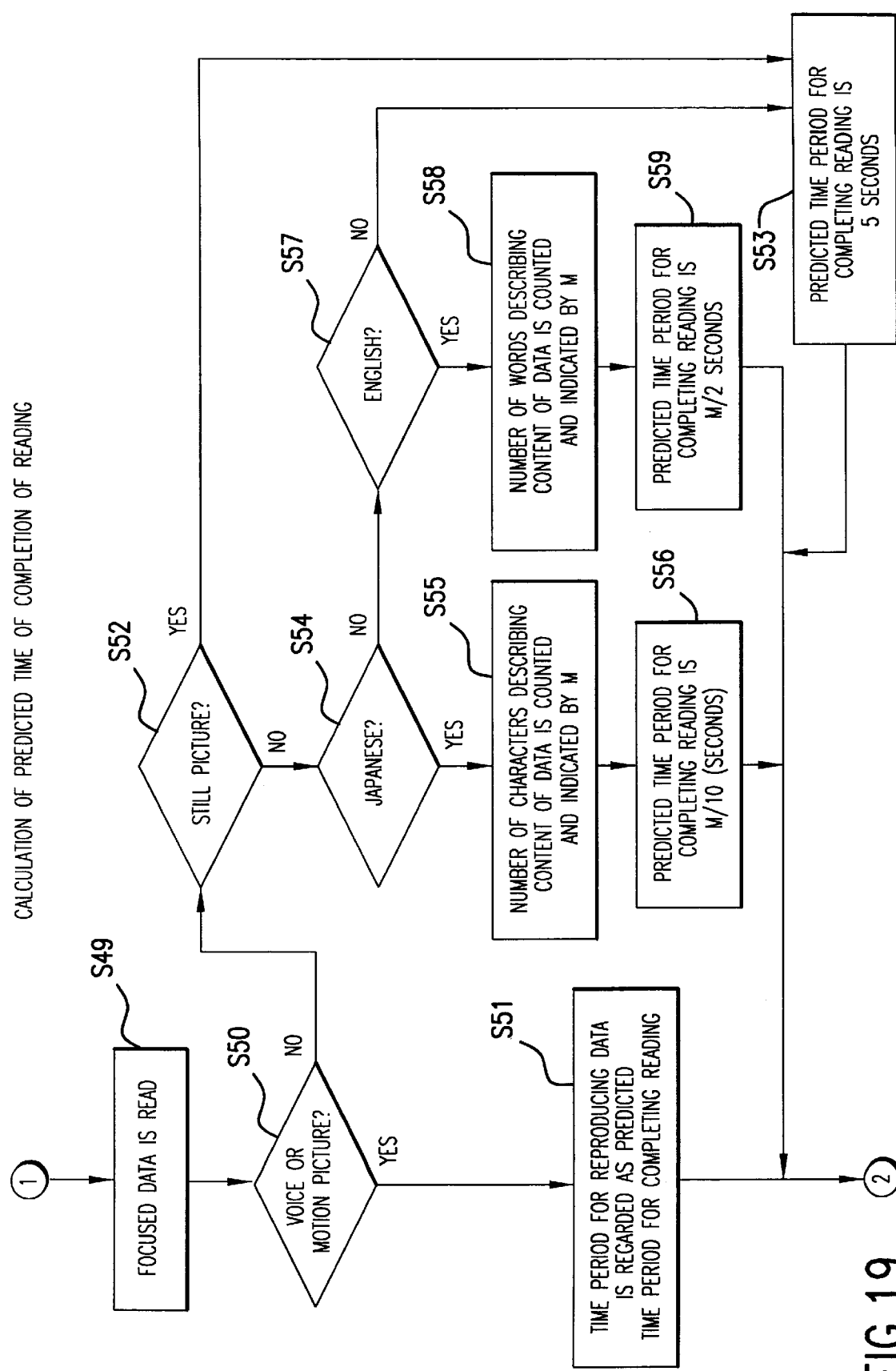
FIG. 19 is a flow chart showing procedures of a predicted time period for completing reading calculating process of the first embodiment of the data outputting system according to the present invention.

In the case where the method of determining timing is neither "time period designation" nor "no-action time period designation", but is "prediction of time period for completing reading", the timing determining component 43 reads the focused data as shown in FIG. 19 (step 49), and determines the predicted time period for completing reading after the distinction based on the type of medium of the data.

In short, in the case of motion picture data or voice data (step 50), the time period for reproducing the data is regarded as the predicted time period for completing reading (step 51). If the time period for reproducing the data is too long for the user to wait for completion of reproduction, he/she can force the peripheral data to be represented without waiting for the completion of reproduction of the focused data by clicking the peripheral data representing button 60 shown in FIG. 60.

In the case of a still picture (step 52), the predicted time period for completing reading is determined to be 5 seconds. This is because, in general, it does not take much time to grasp the still picture. Therefore, a 5-second period is set for the time period for completing reading as a pause from the display of the still picture, which is a relatively short time period. However, if it is too long for the user, he/she can click the peripheral data representing button 60.

If the focused data is neither image data nor voice data, but text data, the data is classified according to the kind of language.

In the case of the text written in Japanese (step 54), the number of characters describing the content of the focused data is counted (step 55), and the quotient obtained by dividing the counted number of characters M by 10 is regarded as the predicted time period for completing reading (step 56). If the text data is written in English (step 57), the number of words describing the contents of the focused data is counted (step 58), and the quotient obtained by dividing the counted number of words M by 2 is regarded as the predicted time period for completing reading (step 59). For the text data written in a language other than Japanese or English, the predicted time period for completing reading is determined to be 5 seconds (step 53).

The value calculated by adding the predicted time period for completing reading determined as described above to the time of representation of the focused data C is determined to be the timing of representing the peripheral data (step 60).

The reason why the predicted time period for completing reading of the text written in Japanese, which is our native language, is determined to be the value obtained by dividing the number of characters by 10 is that the average reading speed of a Japanese language text by a Japanese person is 600 characters in a minute, namely, 10 characters per second. The reason why the predicted time period for completing reading of the text written in English, which is relatively familiar to us, is determined to be the value obtained by dividing the number of words by 2 is that the average reading speed of an English text by a native speaker of English is 330 words in a minute, namely, 5 words per second in general, and based on that average, it is roughly estimated that the reading speed of an English text by a Japanese person, not a native speaker of English, may be about 2 words per second. The average reading time is discussed in "Foundation of Cognitive Science", edited by Michael I. Posner, Massachusetts Institute of Technology, 1989.

The representing process according to the present embodiment of the system is now discussed in detail based on a specific example. The data dealt with in the following explanation also includes a title, content and a set of keywords, as shown in FIG. 5.

The system obtains the method of timing of representing the peripheral data from the user. Here, "prediction of time period for completing reading" is assumed to be the default.

It is also assumed that the data "today's schedule" shown in FIG. 20 is selected as the focused data.

Then the focused data designation obtaining component 35 obtains the above designation and transfers the focused data to the focused data representing component 36. The focused data representing component 36 represents the focused data to the region (1) shown in FIG. 7 and stores the present time and the contents of the focused data in the timing table 42.

FIG. 21 shows the content of the timing table 42 at this time. That is, 13:46:22 is the time of representation of the focused data, "prediction of time period for completing reading" is the method of determining timing, and the data content of "today's schedule" is the numerical information.

Next, the peripheral data determining component 38 calculates the distance between the focused data shown in FIG. 20 and another piece of data "electronic mail" shown in FIG. 22 as follows. In this example, it is assumed that the focused data and the peripheral data are not created in the same day.

As shown in FIG. 20, the set S of the keywords of the focused data is {December 9, schedule, Mr. A, Group B, Forum, Mr. C}, and the set of the keywords of the peripheral data is {December 9, electronic mail, A**} as shown in FIG. 22. The common keyword appearing in both focused data and peripheral data is December 9; therefore the value of P is 1.

Then, the value of T is calculated. The focused data and the peripheral data are created on different dates. Accordingly, the value of T is 0.

Consequently, the degree of relation of the focused data and the peripheral data is 1, and thus, the distance becomes 1.

In this way the distance between the focused data and every piece of peripheral data is calculated. For the 8 pieces of the peripheral data having the closest distance, the layout and the timing of representation are determined and then the pieces of the peripheral data are represented as shown in FIG. 1.

The layout of the pieces of peripheral data is determined at random and the determined layout is stored in the layout table 40.

Since the timing of representation of the peripheral data is the predicted time period for completing reading in this example, the content of the focused data is obtained from the timing table 42 at first and then the number of characters describing the content is counted, and the timing of representation is determined based thereon. For example, if the number of characters is 81, the quotient obtained by dividing 81 by 10 is 8.1. It is added to the time of representing the focused data (13:46:22), and thereby the time of representing the peripheral data is 13:46:30.1.

The number of the pieces of peripheral data is assumed to be 8 in the above explanation of the present embodiment, but this is not a limitation. However, based on the fact it is known that the number of chunks of information which a person can memorize at once ranges from 5 to 9 (See "The magical number seven, plus or minus two: Some limits on our capacity for processing information", G. A. Miller, Psychological Review, 63, 1956, pp. 81–97). Therefore, by setting the number of pieces of peripheral data to be 8, the number of pieces of data displayed on the screen is 9 including the focused data, which is within the range of the number of groups of information that a person can memorize at once. Since the screen G has a square shape, it is assumed that the pieces of the data are also displayed in square regions. Further, if it is assumed that the focused data is located in the center of the screen, 9 may be an upper limit to the number of pieces of data for dividing the screen into regions in an orderly manner.

So far, the number of items of focused data is assumed to be 1 because in many cases it is 1, but it is not necessarily limited thereto. A plural number of pieces of data may be accepted as long as the user can recognize them as a group. To determine the kind of the group depends on granularity required by the user. In some cases the user pays attention to a piece of data, and in other cases, he/she pays attention to plural pieces of data depending on one another at the same time. For example, if a class hierarchy is considered, the user who packages applications wants to see every class in some cases, and a module represented by class hierarchies in the other cases. In the case where the user wants to see a module, desired granularity differs by users.

The user recognizes the focused data because it is located in the center of the display region. Further, it is also possible to distinguish the focused data from the peripheral data by shape or color of the frame of the region in which the data is displayed, shape (character font) or color of the content of the data or the like, and not only by the position of the data.

In the above explanation, the screen display is divided into regions of fixed sizes, but it can be flexibly divided in accordance with the type of focused data and pieces of peripheral data selected corresponding to the focused data.

With regard to both focused data and peripheral data, if the data is too large to be displayed in the designated region, text is displayed by utilizing scrolling function and still pictures or motion pictures are reduced to be displayed. In addition, the text may be displayed by summarizing, and the scrolling function can also be applied to the still picture or motion picture.

For explanation of determining timing of representing peripheral data, two kinds of examples were taken: one utilizing only the number of characters, and another utilizing a combination of the type of medium of the data, the kind of language, and the number of characters. However, combinations of the type of medium and the kind of language, the type of medium and the number of characters, and the kind of language and the number of characters can be utilized, too. Further, it is possible to determine the predicted time period for completing reading of text data written in one language to be constant irrespective of the number of characters.

In the above description, the timing of representing the peripheral data is determined according to the type of medium of the focused data, but the type of medium of the peripheral data may be the factor of determination of timing of representation as well as that of the focused data.

Second Embodiment

Figure 23:
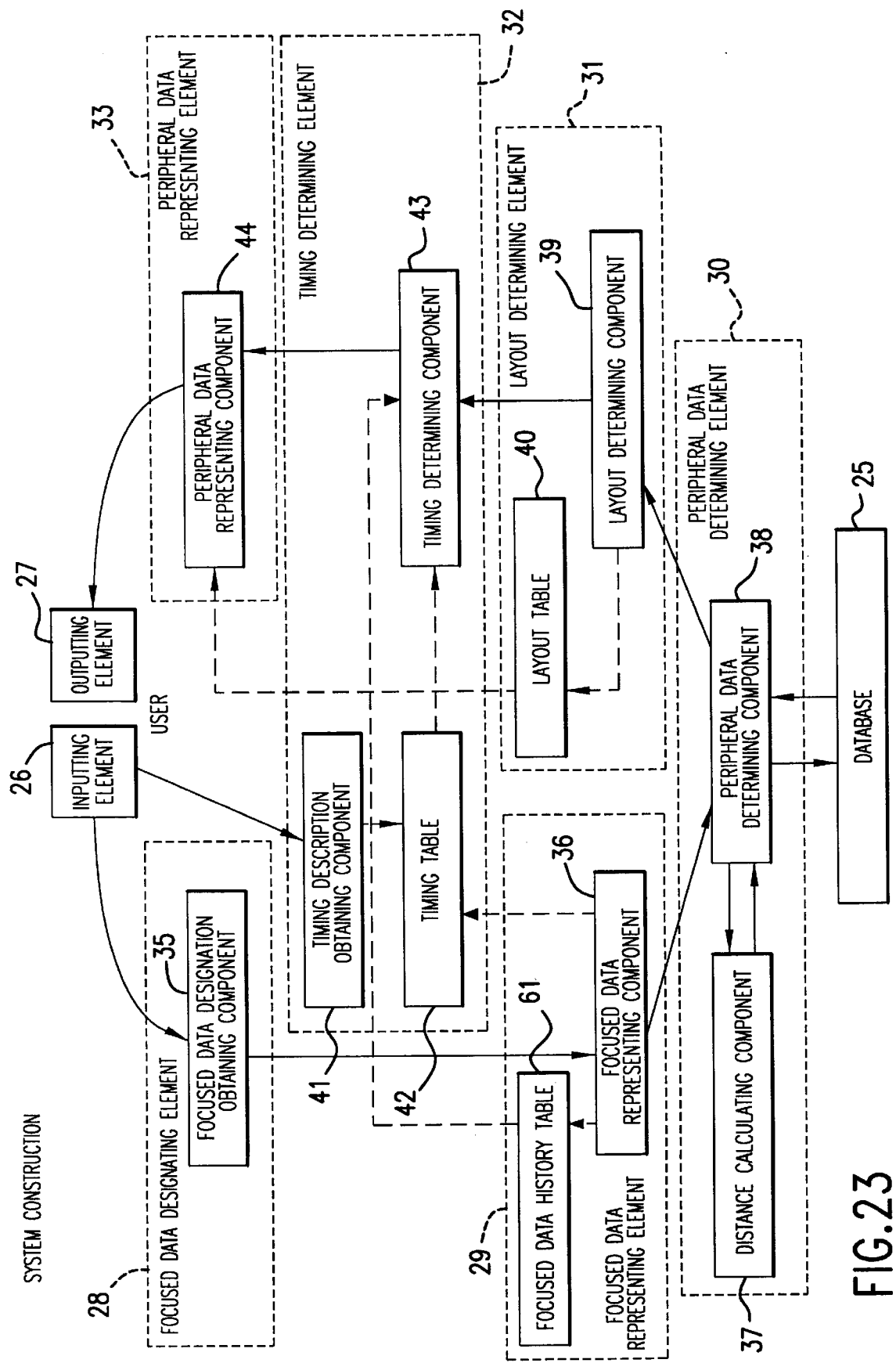
FIG. 23 shows a system construction of the second embodiment of the data outputting system according to the present invention.

FIG. 23 shows the construction of the second embodiment of the data outputting system according to the present invention. The data structure dealt with in the second embodiment is the same as that shown in FIG. 5. Components corresponding to components of the first embodiment have the same reference numbers as those of the first embodiment and the redundant explanation is omitted.

The second embodiment employs an empirical rule that the time period for completing reading of the data that has been previously read is shorter than that of the data which has not been read yet. Therefore, the timing of representation of the peripheral data is determined corresponding to the number of times of representation of the focused data in the past.

In addition to the construction shown in FIG. 6, a focused data history table 61 is added to the focused data representing element 29 in the second embodiment of the data outputting system. As shown in FIG. 24, the focused data history table 61 holds an identifier 62 for identifying data and the number of times of representation of the data as the focused data in the past 63 related to each other. The number of times 63 is counted by the focused data representing component 36, and the information in the table 61 is utilized by the timing determining component 43.

The focused data history table 61 is extensible, and only the data previously designated as focused data is administered by the table. If data which has not yet been designated as focused data is then designated as focused data, the focused data representing component 36 adds a new line for the data to the focused data history table 61 and stores the identifier 62 and the number of times 63.

The processes in the second embodiment of the system are as same as those of the first embodiment except the processes of the focused data representing component 36 and the timing determining component 43. The different processes are described as follows.

Figure 25:
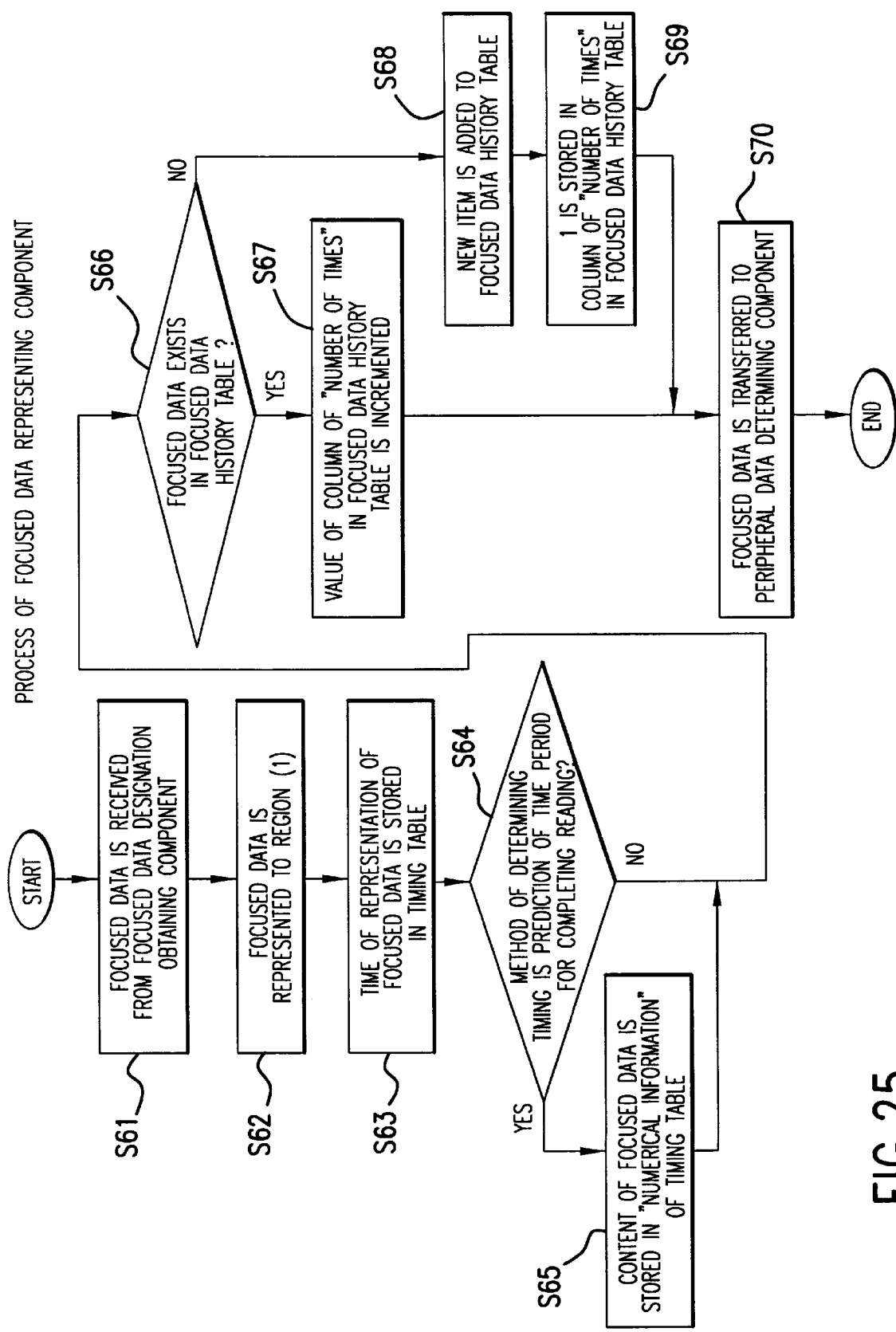
FIG. 25 is a flow chart showing procedures of a focused data representing process of the second embodiment of the data outputting system according to the present invention.

The process of the focused data representing component 36 is executed in accordance with the procedures shown in FIG. 25. At first, the focused data is received from the focused data designation obtaining component 35 (step 61), and the data is represented to the region (1) shown in FIG. 7 in the same manner as the first embodiment (step 62).

Then, the present time is stored in the column of "time of representation of focused data" in the timing table 42 (step 63) and, if the column of the method of determining timing in the timing table 42 is "prediction of time period for completing reading" (step 64), the content of the focused data is stored in the column of "numerical information" in the timing table 42 (step 65).

Next, it is checked whether the represented focused data exists in the focused data history table 61 or not (step 66). If the focused data in question exists in the focused data history table 61, "1" is added to the value of the column of "number of times" in the column of the data in the focused data history table 61 (step 67). In contrast, if the focused data does not exist in the focused data history table 61, a line for the item is added to the bottom of the focused data history table 61 (step 68), and an identifier of the focused data and "1" as the number of times are entered therein (step 69).

Then, the focused data representing component 36 transfers the focused data to the peripheral data determining component 38, and thereby the process is completed (step 70).

Figure 26:
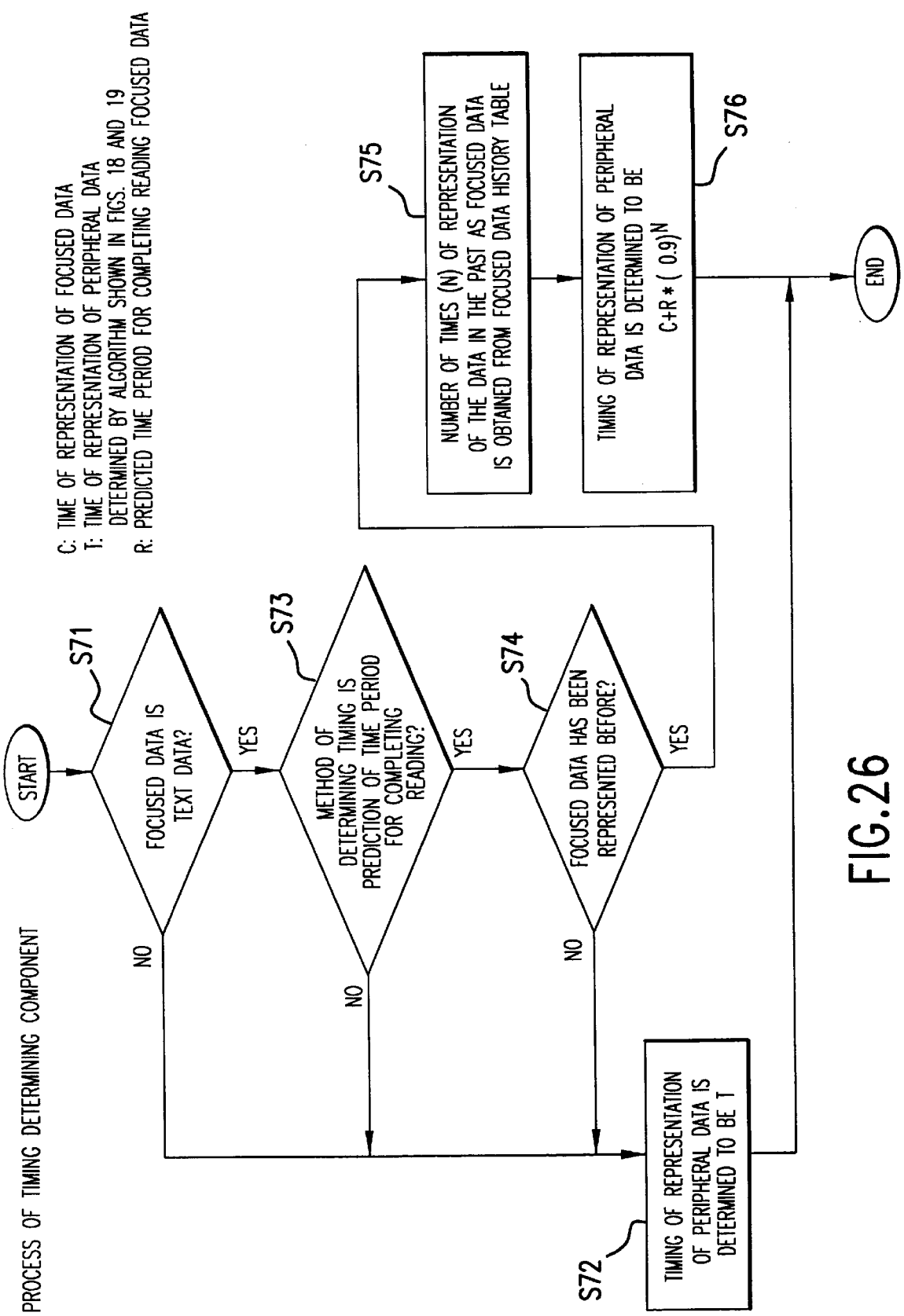
FIG. 26 is a flow chart showing procedures of a timing determining process of the second embodiment of the data outputting system according to the present invention.

The timing determining component 43 executes the procedures shown in FIG. 26. Accordingly, if the data represented in the past is designated as the focused data, the timing of representation is set to be earlier than the case of data designated as the focused data for the first time.

At first, the timing determining component 43 once determines the timing of representing the peripheral data in the same way as the first embodiment, and then executes the process shown in FIG. 26. Here, it is assumed that the time of representation of the focused data is indicated by C, the timing of display of the focused data is indicated by T, and the predicted time period for completing reading of the focused data in the case where the method of determining timing is "prediction of time period for completing reading" is indicated by R.

Specifically, the process is executed as follows. It is checked whether the focused data is the text data or not (step 71). If the focused data is not the text data, the timing determining component 43 determines the timing of representation of the peripheral data to be T without changing (step 72). If the focused data is the text data, the timing determining component 43 confirms whether the method of determining timing is "prediction of time period for completing reading" or not (step 73). If it is not "prediction of time period for completing reading", the timing of representation of the peripheral data is determined to be T without changing (step 72). If the method of determining timing is "prediction of time period for completing reading", the timing determining component 43 checks whether the item of the current focused data exists in the focused data history table 61 or not (step 74). In the case where the item does not exist in the table, the data is to be represented for the first time as the focused data; therefore, the timing of representation of the peripheral data is determined to be T without changing (step 72).

In contrast, in the case where the item of the current focused data exists in the focused data history table 61, the data has been represented before as the focused data. Therefore, the timing determining component 43 reads the number of times N of representation of the current focused data in the past as the focused data from the focused data history table 61 (step 75). Then, the timing determining component 43 determines the timing of representation of the peripheral data by calculating $C+R*(0.9)^N$ (step 76).

In the present embodiment, the predicted time period for completing reading of the data that has been represented as the focused data in the past is quickened only if the current focused data is text data. However, the same process is available for motion picture data, voice data and still picture data.

In the above explanation, it is presumed that the predicted time period for completing reading the data which has been read before is shorter than that of the data which has not been read. Further, it may be considered that the time period for completing reading the data not completely the same as, but similar to, the data having been read before also becomes shorter. Therefore, even if the current focused data has not been read before (i.e., if the data does not exist in the focused data history table 61), it is checked whether there has been data in the past which is similar to the current focused data (whether data similar to the current focused data is stored in the focused data history table 61). Then, if similar data exists in the table, the predicted time period for completing reading the current data can be shortened. The degree of similarity between two pieces of data adopted here can be obtained by executing a morphological analysis for the pieces of data to generate word vectors and calculating the inner products of the word vectors. Then a threshold value is determined, and if the degree of similarity exceeds the threshold value, it can be concluded that the similar data has been represented before.

Third Embodiment

FIG. 27 shows the construction of a focused data history table 61 related to the third embodiment of the data outputting system according to the present invention. The system construction of the third embodiment is the same as that of the second embodiment except the construction of the focused data history table 61.

The present embodiment is based on an empirical rule that the time period of completion of reading the data that has been read recently is shorter than for other pieces of data that have not been read before, and the present embodiment determines the timing of representation of the peripheral data by utilizing the time of last representation of the focused data.

Unlike that of the second embodiment, the focused data history table 61 of the present embodiment retains an identifier 62 for identifying data and the date and time 64 when the relevant data was represented as the focused data related to each other as shown in FIG. 27.

The process of the present embodiment of the system is the same as that of the second embodiment previously described with reference to FIG. 25, except for the processes of the focused data representing component 36 and the timing determining component 43. The different processes are discussed as follows.

Figure 28:
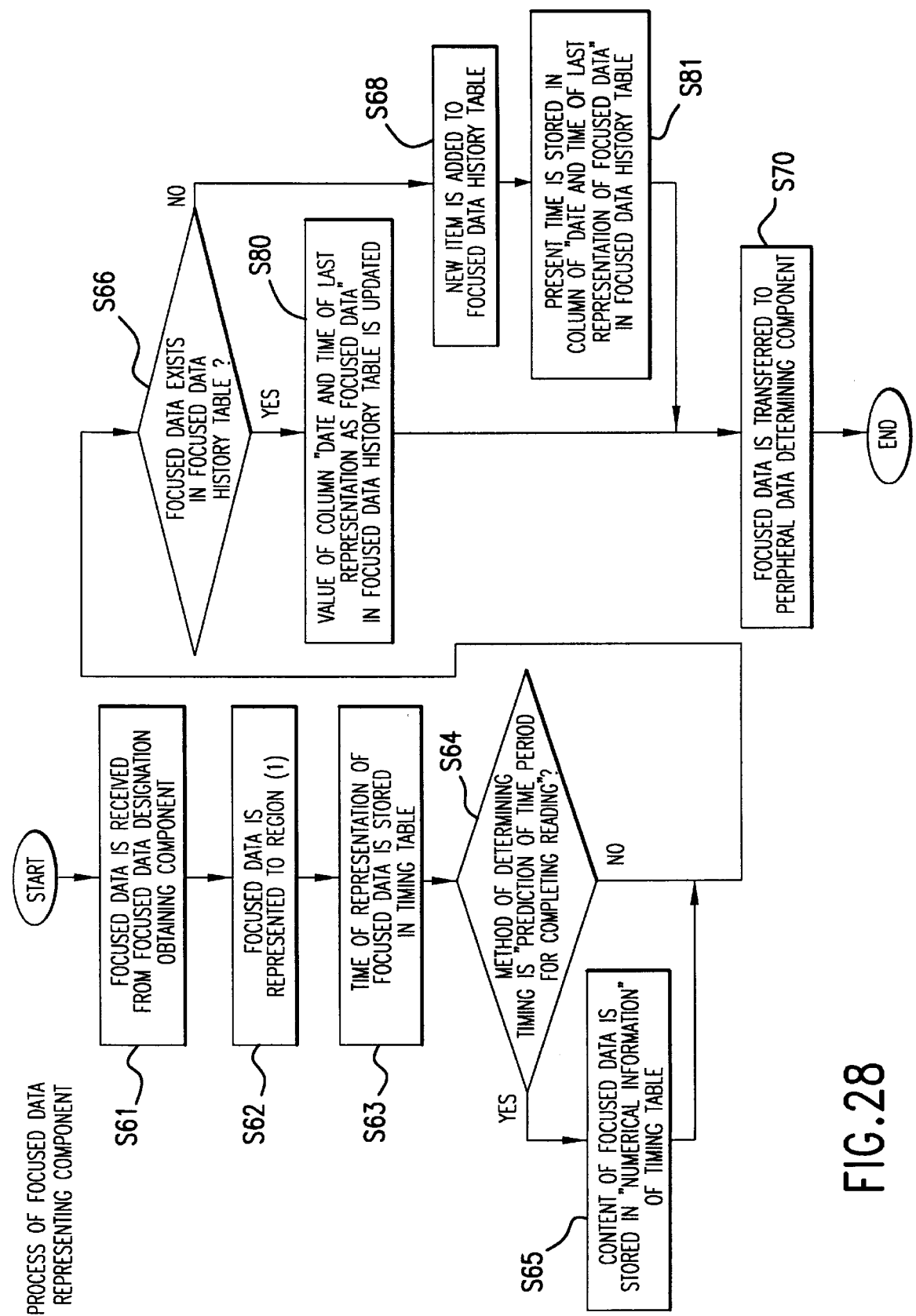
FIG. 28 is a flow chart showing procedures of a focused data representing process of the third embodiment of the data outputting system according to the present invention.

The process of the focused data representing component 36 is executed according to the procedures shown in FIG. 28, in which steps 61 through 66 are the same as those of the second embodiment.

It is checked whether the focused data which has been represented exists in the focused data history table 61 or not (step 66). If the relevant focused data exists in the focused data history table 61, the present time is entered in the column 64 of "date and time of last representation as focused data" of the relevant data in the focused data history table 61 by overwriting the present time therein (step 80). Thereby the content of the column of the "date and time of last representation as focused data" 64 is updated to the latest date and time.

In contrast, if the focused data does not exist in the focused data history table 61, a new item line is added to the bottom of the focused data history table 61 (step 68) and the identifier of the relevant focused data and the present time are described in the added line and the column 64 of "date and time of last representation as focused data", respectively (step 81).

After that, the focused data representing component 36 transfers the focused data to the peripheral data determining component 38, and the process is completed (step 70).

Figure 29:
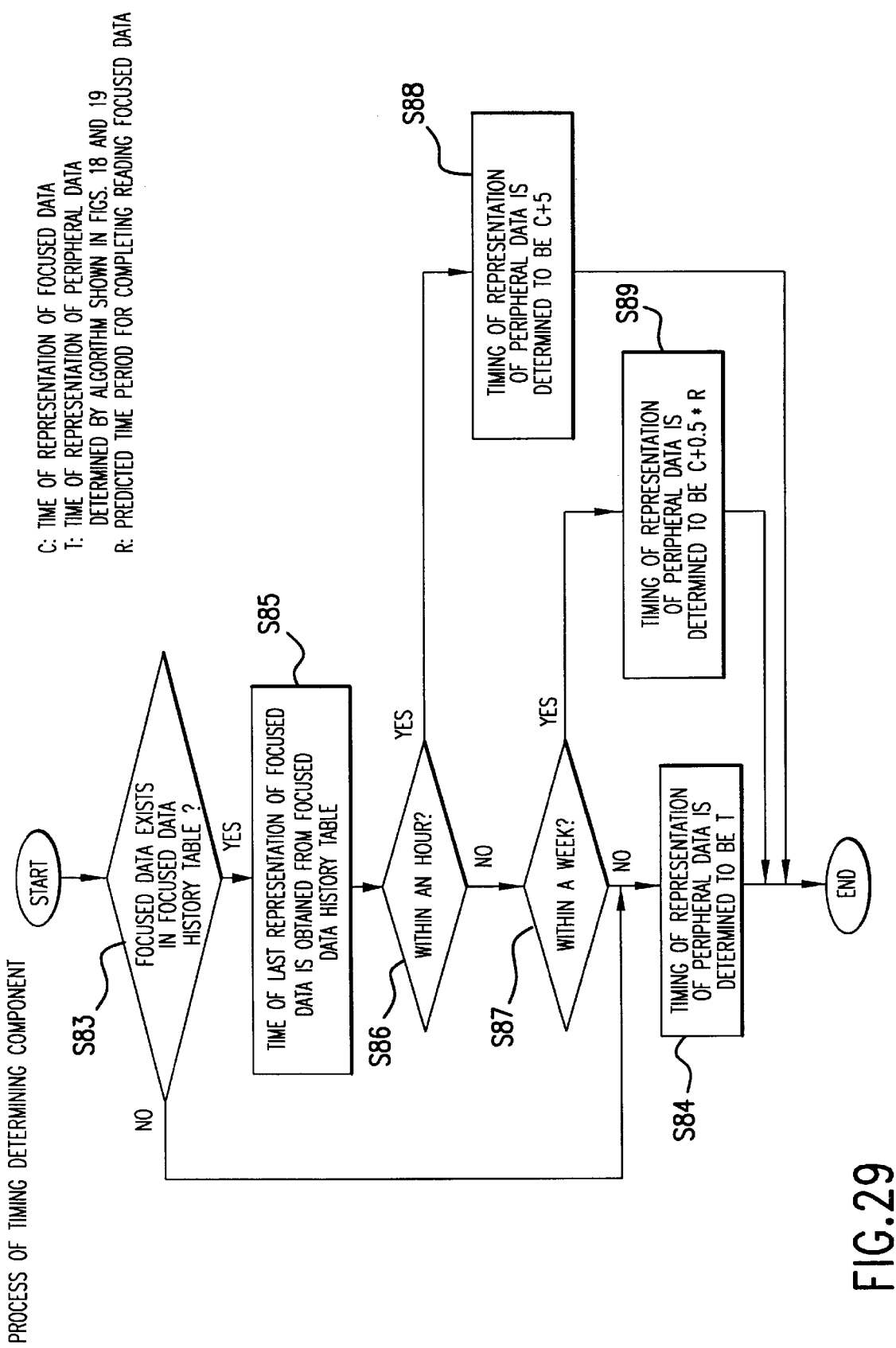
FIG. 29 is a flow chart showing procedures of a timing determining process of the third embodiment of the data outputting system according to the present invention.

The timing determining component 43 sets the timing of representation of the peripheral data so that the pieces of peripheral data related to the focused data which have been read recently are represented earlier than the pieces of the peripheral data related to the focused data which have not been read before by executing the procedures shown in FIG. 29.

As a first step, the timing determining component 43 determines the timing of representation of the pieces of the peripheral data in the same way as the second embodiment, and executes the procedures shown in FIG. 29. Here, the time of representation of the focused data is indicated by C, the timing of representation of the focused data is indicated by T, and the predicted time period for completing reading of the focused data when the method of determining timing is "prediction of time period for completing reading" is indicated by R.

The procedures shown in FIG. 29 are now concretely described. It is checked whether the identifier of the current focused data exists in the focused data history table 61 or not (step 83), and in the case where the identifier does not exist, the timing of representation of the peripheral data is determined to be T (step 84). If the identifier exists in the table, it means that the data has been represented in the past as the focused data. Therefore, the timing determining component 43 obtains the latest date and time of representation of the data as the focused data from the focused data history table 61 (step 85).

Then the acquired date and time is examined (steps 86 and 87). If the time of representation is earlier than the present time within an hour, the timing of representation of the peripheral data is determined to be C+5 (step 88). In the case where the date and time of representation of the focused data is earlier than the present time by more than an hour and within a week, the timing of representation of the peripheral data is determined to be C+0.5*R (step 89). In the cases other than mentioned above, that is, if the date and time of representation of the focused data is earlier than the present time by more than a week, the timing of representation of the pieces of peripheral data is determined to be T (step 84).

Consequently, if the current focused data is data that has been recently read as focused data, the timing of representation of pieces of peripheral data related thereto is quickened according to the degree of recentness of the date and time of representation of the focused data.

Fourth Embodiment

Figure 30:
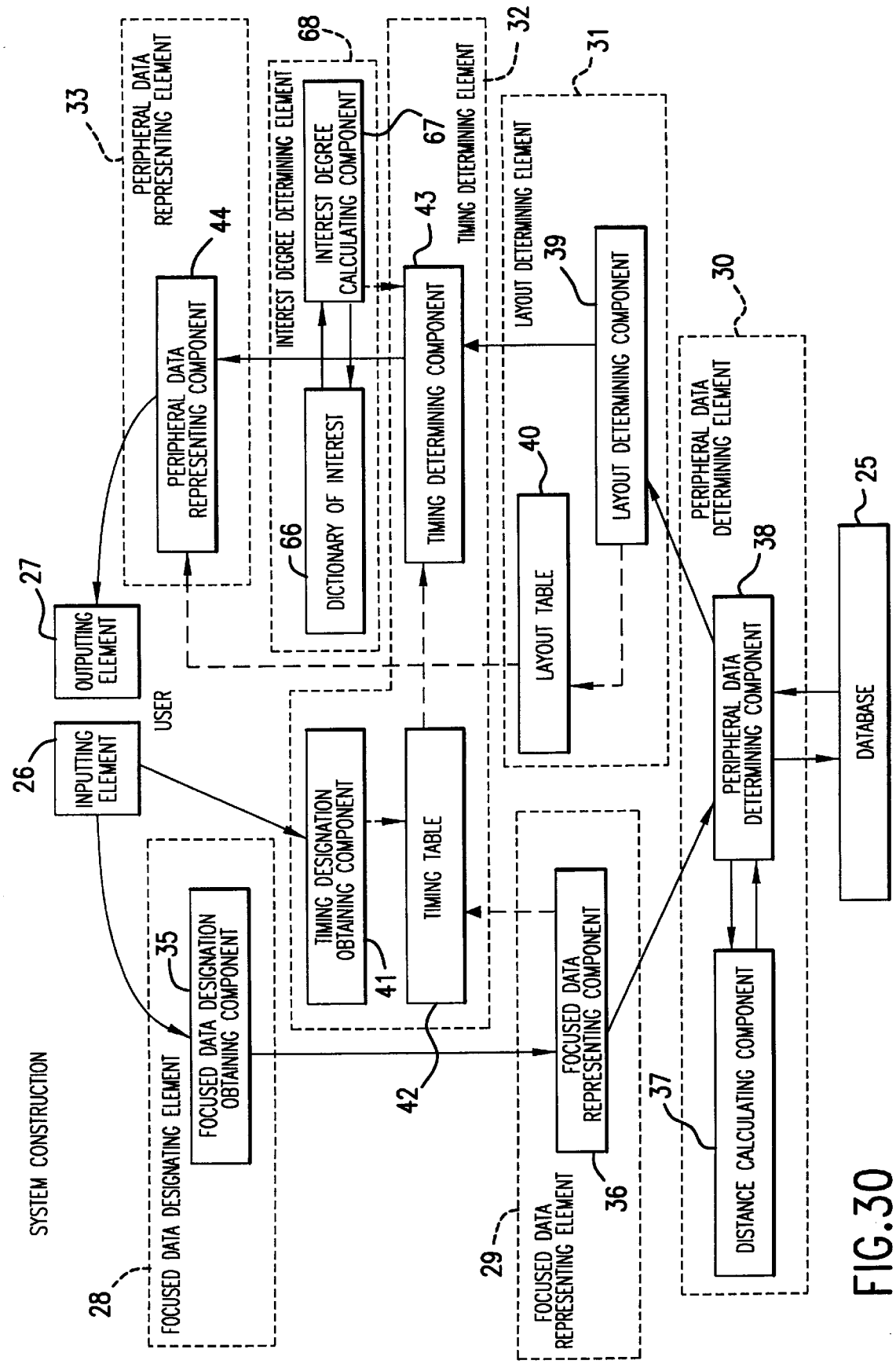
FIG. 30 shows a system construction of the fourth embodiment of the data outputting system according to the present invention.

FIG. 30 shows the construction of the fourth embodiment of the data outputting system according to the present invention. The data structure dealt with by the fourth embodiment is the same as that shown in FIG. 5. Components corresponding to components of the first embodiment have the same reference numbers as those of the first embodiment, and redundant explanations are omitted.

This embodiment determines the timing of representation of the peripheral data based on the attributes of the user. There are various kinds of attributes of the user, for example, the distinction of sex, age, occupation, specialty, interest, hobby and so on. Here, the case where the timing of representation of the peripheral data is determined based on how much the user is interested in the focused data is taken as an example for explanation.

Every user is apt to glance over the information in which he/she is not very much interested, or to stop reading as soon as the purpose of reading is accomplished. That is, the user is apt to spend as little time as possible on reading data in which the user determines himself/herself not to be very much interested. There is also a tendency that reading of focused data which is already known (i.e., not being read for the first time) is completed earlier than the case of reading data which is read for the first time.

The present embodiment uses a dictionary of interest for determining the degree of interest of the user in the focused data. In the following discussion, the case of utilizing the dictionary for determining the degree of interest is taken as an example, but it is also possible to prepare a dictionary for determining if the focused data is related to the user's specialty or hobby in a similar format and to utilize it.

In addition to the construction of the first embodiment shown in FIG. 6, an interest degree determining element 68 having an interest degree calculating component 67 and a dictionary of interest 66 is disposed to the present embodiment of the data outputting system.

The dictionary of interest includes sets of keywords (words) which are a clue to the user's interest, and their weight. The dictionary 66 is prepared as follows, for example.

It is assumed that there is an information database in which a user stores data. If the user desires to retrieve a piece of information from the information database, a word (keyword) is designated to retrieve the desirable piece of information. For speedy retrieval, or retrieval by utilizing the words frequently used, there is an information database in which keywords are assigned to each of the pieces of data and stored together with the pieces of data. The words (keywords) designated by the user in retrieving information are collected, and a value is set to each of the words in proportion to frequency of use, whereby the dictionary of interest 66 is prepared. The value can be adjusted based on the kind of characters of the keyword. For example, a higher value can be set to the keyword described by kanji (Chinese characters) or katakana (one of the two kinds of Japanese kana script used for syllabary writing with square characters). Of course, the user can adjust the value by himself/herself.

The process of the present embodiment of the data outputting system is the same as that of the first embodiment described above except for the process of the interest degree determining element 68. The different process, namely, determination of the degree of interest about the focused data by the interest degree determining element 68 and determination of timing of representation of the peripheral data by the timing determining component 43 based on the value of the degree of interest, is explained as follows.

Figure 31:
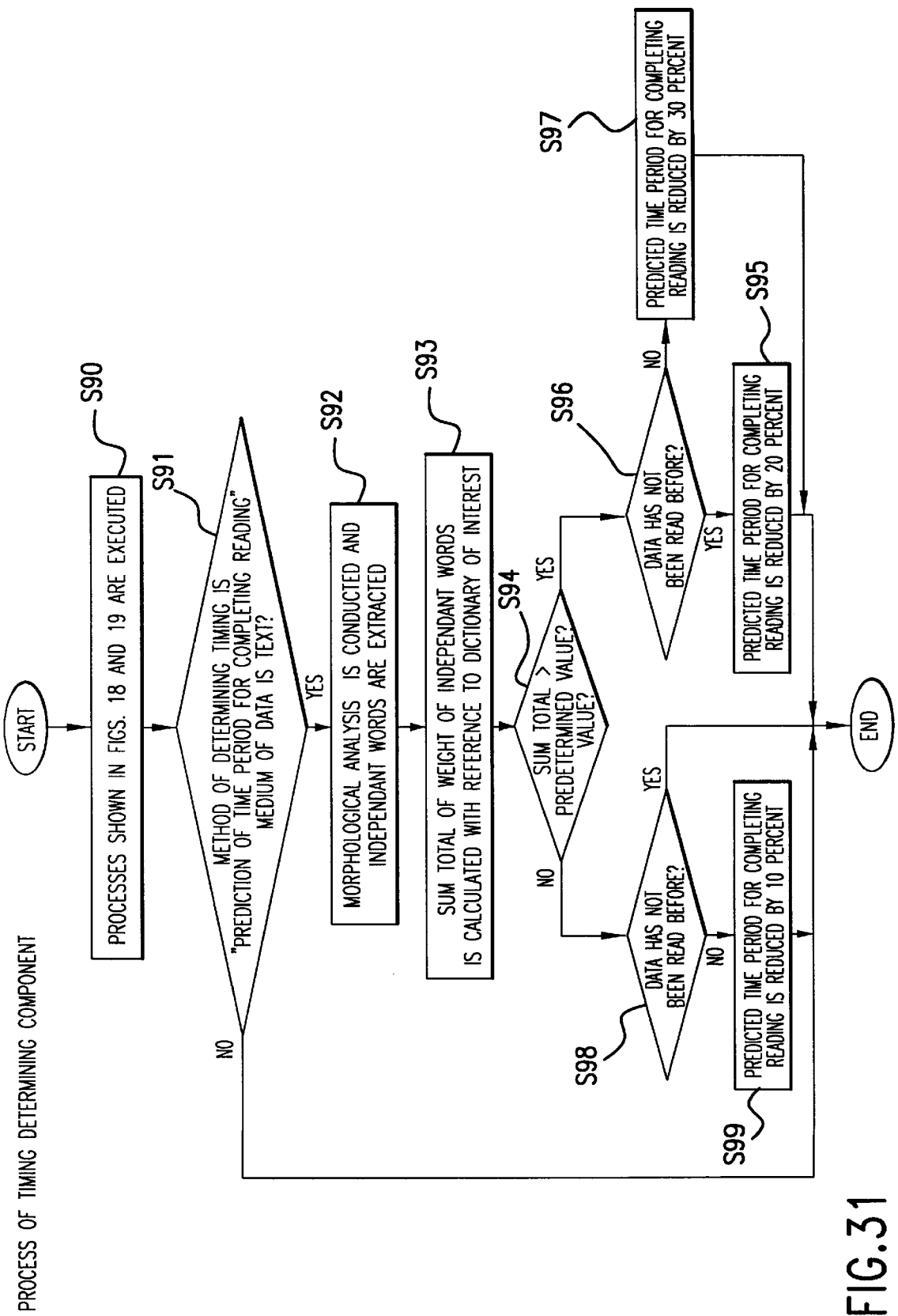
FIG. 31 is a flow chart showing procedures of a timing determining process of the fourth embodiment of the data outputting system according to the present invention.

The process of the timing determining component 43 is executed according to the procedures shown in FIG. 31. After the execution of processes shown in FIGS. 18 and 19 (step 90), the following processes are performed.

At first, it is checked whether the focused data is text data and the method of determining timing is "prediction of time period for completing reading" or not (step 91). If the focused data and the method of determining timing satisfy the conditions, morphological analysis is executed on the content of the focused data to extract independent words (words making sense by themselves, such as nouns, verbs, adjectives or the like) (step 92).

Then, a value (weight) is obtained for each of the independent words with reference to the dictionary of interest 66 (step 93). In this case, independent words redundantly extracted are regarded as a single word. It is also possible to set the weight according to the frequency of extraction of the independent word from the dictionary of interest 66, wherein the value of a word not entered into the dictionary of interest is 0.

Then, it is checked whether the sum total of the values of weight of the independent words contained in the focused data calculated as described above exceeds the value predetermined in the timing determining component 43 (step 94). In this example, the sum total of the weight values is compared with the predetermined value, but there is no problem if an average value of the of weight values of the independent words is compared with the predetermined value.

As a result of comparison, if the sum total is less than the predetermined value, the focused data is regarded as the data in which the user is not interested, and then it is determined whether the predicted time period for completing reading is changed depending on whether the focused data has been read before or not (steps 98 and 99). That is, the predicted time period for completing reading is reduced by 10 percent in the case of the focused data having been read before (step 99), and the predicted time period for completing reading is not changed in the case of focused data which has not been read before.

In contrast, if the sum total is larger than the predetermined value, the focused data is regarded as interesting to the user, and the degree of change of the predicted time period for completing reading is determined depending on whether the data has been read before or not (steps 95 through 97). More specifically, if the data has not been read before, the predicted time period for completing reading is reduced by 20 percent, and if the data has been read before, the predicted time period for completing reading is reduced by 30 percent (step 97).

In the above description, the sum total of values of weight of the independent words contained in the focused data is used for determining whether the user is interested in the data or not. In the case where the data has a list of keywords used for retrieval, it is also possible to utilize the sum total or average of values of weight of the keywords given to the focused data.

The value utilized for determining whether the user is interested in the data or not is predetermined in the timing determining component 43, but the value can be designated by the user every time at will.

The timing of representation of the peripheral data can also be determined in accordance with the creator of or the date and time of creation of the focused data. In this case, a dictionary of creator or a dictionary of date and time of creation can be prepared. With such a dictionary, in the case where the user wants to take time to thoroughly read the focused data created by a person who is important to the user, for example, his/her superior, it is effective to make the pieces of peripheral data to be represented relatively later after representation of the focused data created by such an important person. Moreover, in the case where there is a fixed schedule that the regular meeting is held every Wednesday, it is possible to prepare a dictionary on the basis of the idea that the data created during the time period of the meeting is important.

In the above description, the timing of representation of the peripheral data is determined based on the attributes of the focused data in the first embodiment, the history of representation of the focused data in the second and third embodiments, and the attributes of the user in the fourth embodiment. The timing of representation of peripheral data can be determined based on the combination of all these factors, or the combination of some of them.

Figure 18:
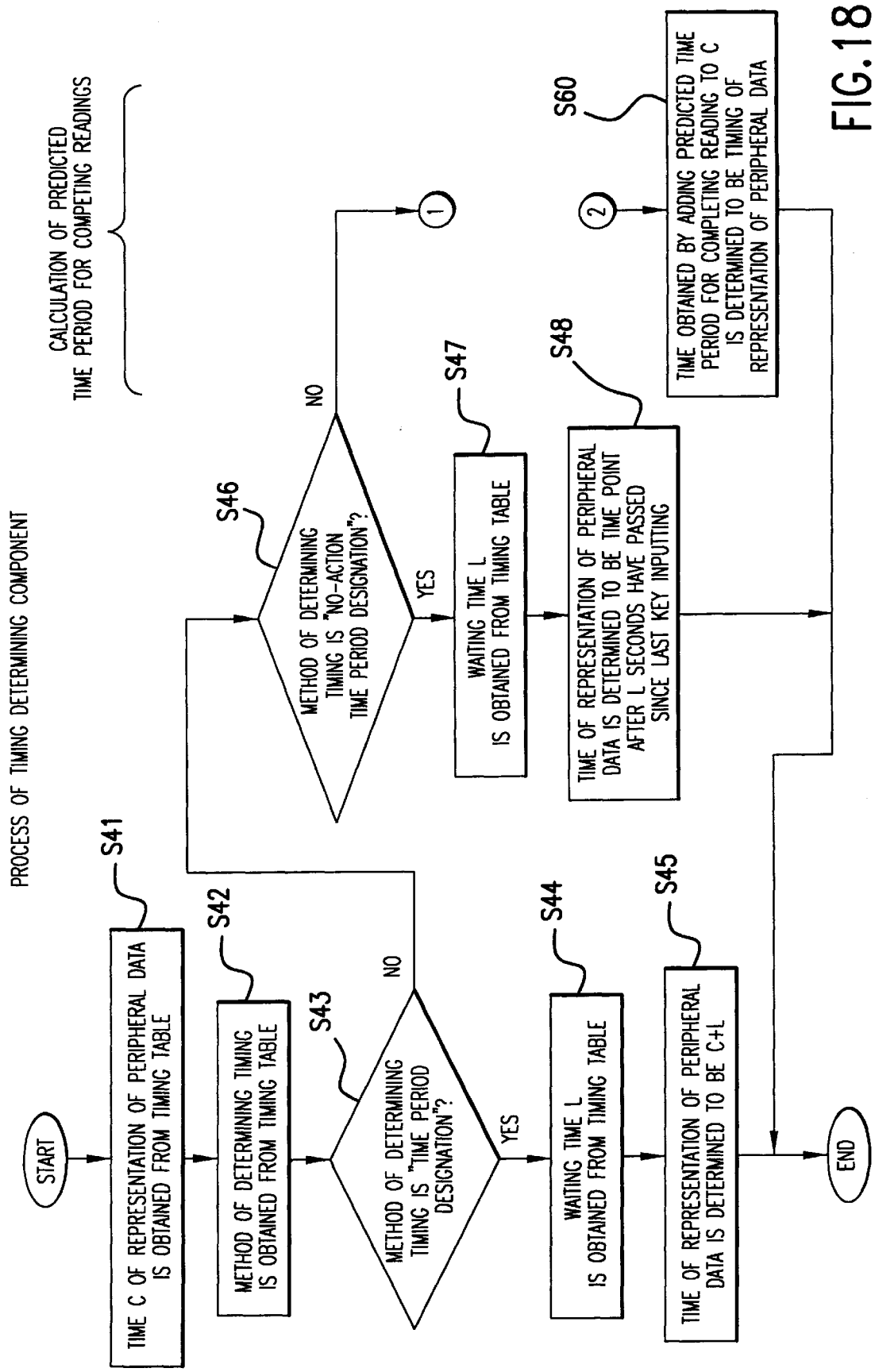
FIG. 18 is a flow chart showing procedures of a timing determining process of the first embodiment of the data outputting system according to the present invention.

For example, as shown in FIGS. 18 and 19, the predicted time period for completing reading is calculated based on the attributes of the focused data. Then it is regarded as R and adjusted based on the history of representation of the focused data as shown in FIG. 26. Then the predicted time period for completing reading is further adjusted based on the attributes of the user as shown in FIG. 31, and finally the timing (time) of representation of the peripheral data is determined by adding the obtained predicted time period for completing reading to the time of representation of the focused data C.

Specifically, if it is assumed that the focused data is the text data described by Japanese (our native language) and having 600 characters in it, and that the focused data has been represented twice in the past as focused data, and that the user is now interested in the content of the data, the timing of representation of the peripheral data is determined in the following way.

In the processes shown in FIGS. 18 and 19, the predicted time period for completing reading is calculated to be 60 seconds according to the type of medium of the focused data, the description language and the number of characters. The predicted time of 60 seconds is indicated by R. By the process shown in FIG. 26, the timing of representation of the peripheral data is determined as follows:

$$C+60*(0.9)^2=C+48.6.$$

Therefore, the time period for completing reading is adjusted to be 48.6 seconds and indicated by R. By the process shown in FIG. 31, the predicted time period for completing reading is reduced by 10 percent, and thereby it is adjusted to be 43.74 seconds. Finally, the timing of representation of the peripheral data is determined by adding the obtained predicted time period to the time of representation of the focused data C. Therefore, it is determined to be C+43.74 seconds.

Fifth Embodiment

Figure 32:
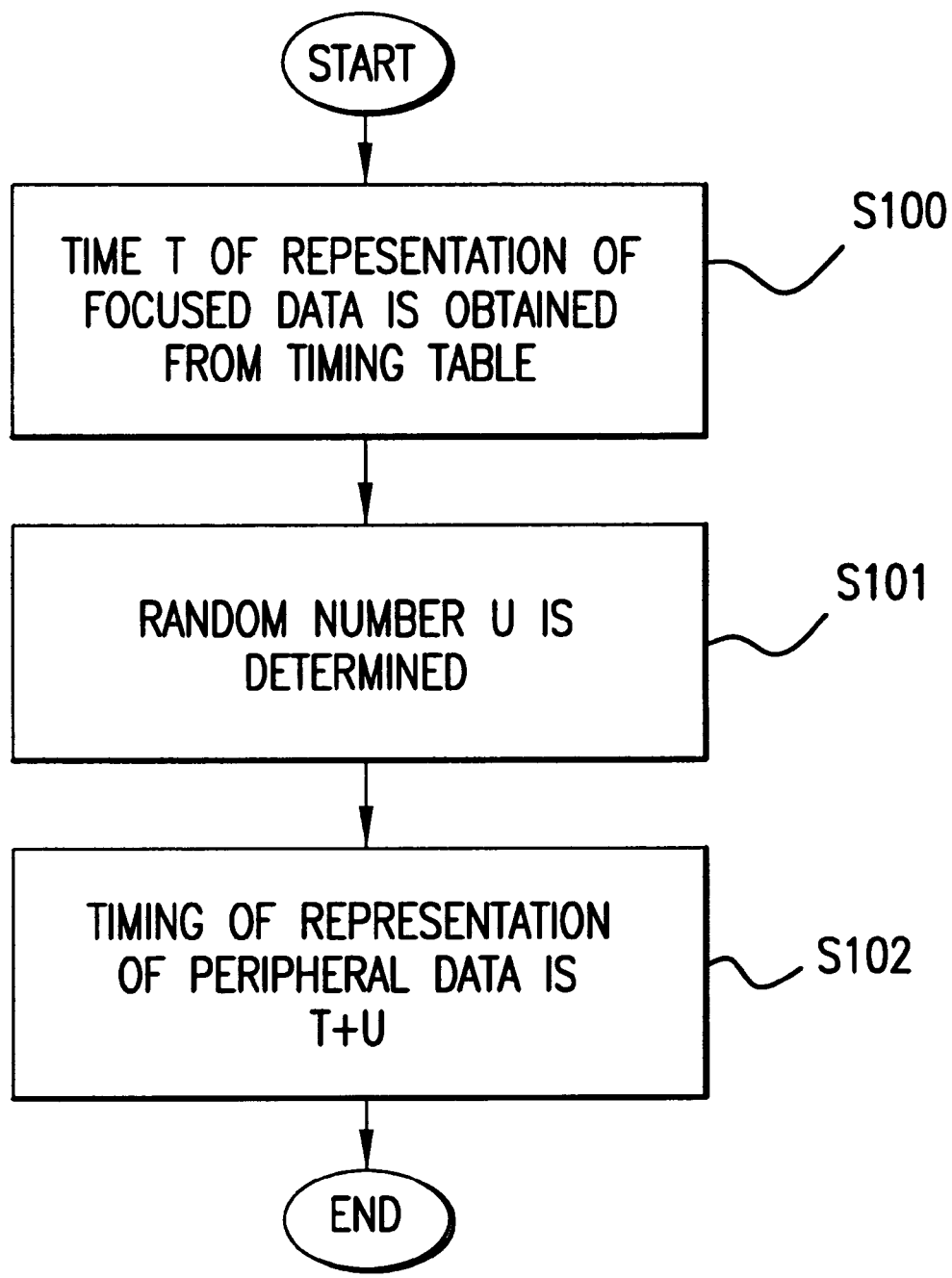
FIG. 32 is a flow chart showing procedures of a timing determining process of the fifth embodiment of the data outputting system according to the present invention.

FIG. 32 shows procedures of the process of the timing determining component related to the fifth embodiment of the data outputting system according to the present invention.

The construction of this embodiment of the system is the same as that of the first embodiment shown in FIG. 6. Processes of this embodiment also correspond to processes of the first embodiment except for the timing determining process.

In this embodiment, the timing determining component 43 randomly determines the number used for determining the timing of representation for arbitrary data regardless of the type of medium of the data and the description language. That is, the timing determining component 43 obtains the time T of representation of the focused data from the timing table 42 (step 100), randomly determines the number used representation (she timing of representation (step 101), adds the randomly determined number U to the time of representation of the focused data (step 102), and thereby the time as a result of addition is determined to be the timing of representation of the peripheral data.

By randomly determining the timing of representation of the peripheral data, pieces of the data are represented to the user at an unexpected timing.

The method of randomly determining the timing can be utilized in combination with the method of determining timing in the first embodiment. For example, it is possible that pieces of data are classified into each type of medium, and then the data of each specific type of medium is represented at the random timing.

Sixth Embodiment

Figure 33:
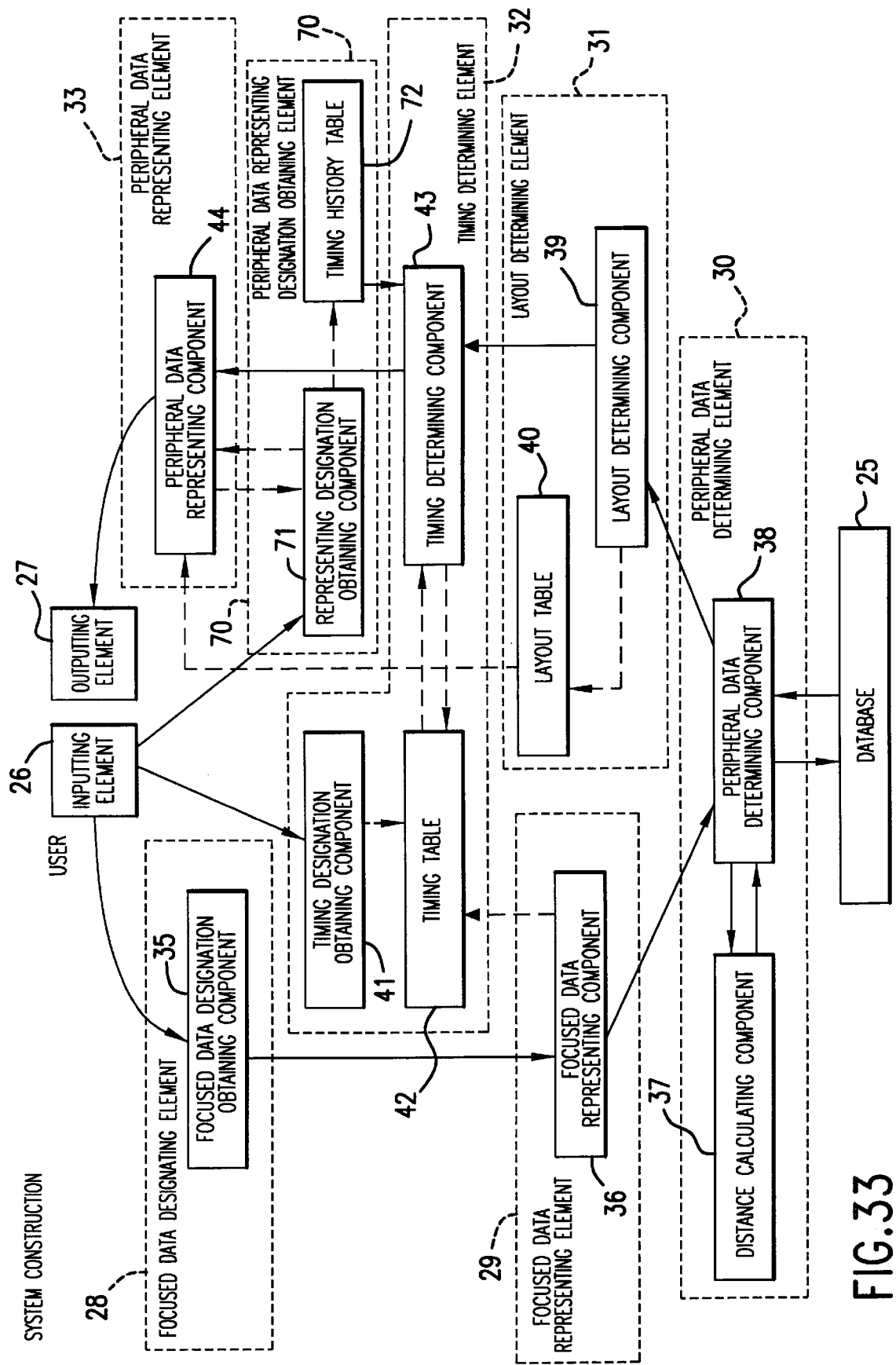
FIG. 33 is a system construction of the sixth embodiment of the data outputting system according to the present invention.

FIG. 33 shows the construction of the sixth embodiment of the data outputting system according to the present invention. The data structure dealt with in the present embodiment of the system is the same as that shown in FIG. 5. Components corresponding to components of the first embodiment have the same reference numbers as those of the first embodiment and the redundant explanations are omitted.

In addition to the construction of the first embodiment shown in FIG. 6, a peripheral data representing designation obtaining element 70 is disposed to the present embodiment of the data outputting system. The peripheral data representing designation obtaining element 70 includes a representing designation obtaining component 71 for obtaining the designation inputted by the user through the inputting element 26 for representing the peripheral data earlier than the timing determined by the timing determining component 43 and a timing history table 72 for holding the history of designation by the user.

The processes of the present embodiment of the data outputting system are the same as those of the first embodiment except for the timing determining process described as follows. The representing designation obtaining component 71 obtains the designation from the user to the effect that the peripheral data should be represented earlier than the timing determined by the timing determining component 43, and according thereto, turns its representation flag on. The representation flag is read by the peripheral data representing component 44. If the flag is on, the peripheral data representing component 44 immediately represents the peripheral data without waiting for the timing determined by the timing determining component 43. The representation flag is set to be off when the peripheral data is represented by the peripheral data representing component 44. As shown in FIG. 34, the timing history table 72 holds the number of times of representation of the peripheral data in the past 73 and an average of the differences between the time of representation of the focused data and the time of representation of the peripheral data on those occasions (namely, average waiting time).

As a user interface of the representing designation obtaining component 71, a button 60 is disposed for requiring the peripheral data to be immediately displayed, as shown in FIG. 16. By clicking the button 60, the user can have the peripheral data immediately represented without waiting for the timing designated by the timing determining component 43.

Figure 35:
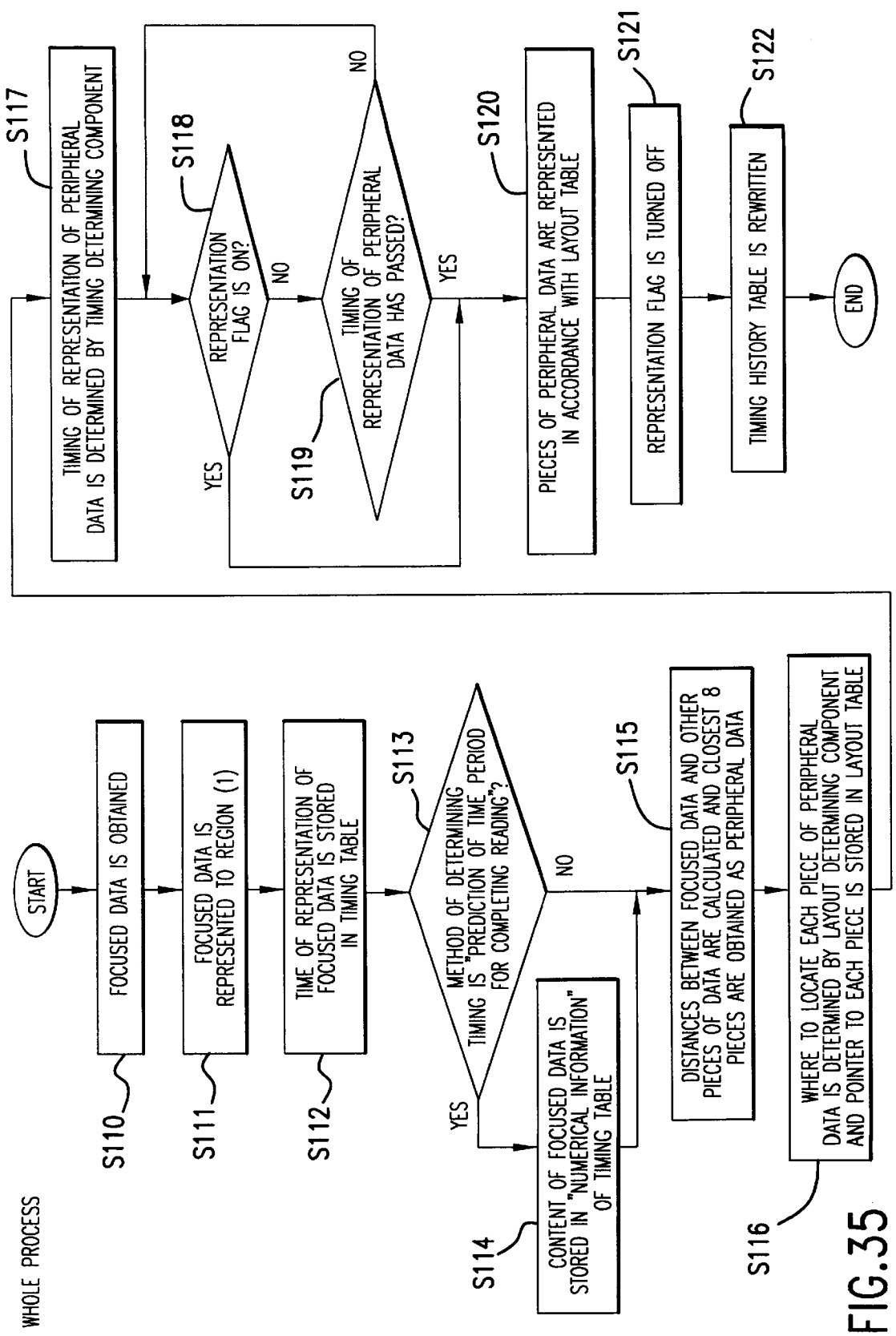
FIG. 35 is a flow chart showing procedures of the whole process of the sixth embodiment of the data outputting system according to the present invention.

The above process can be executed according to the procedures shown in FIG. 35. At first, the focused data representing component 36 receives the focused data from the focused data designation obtaining component 35 (step 110). The received focused data is represented to the region (1) shown in FIG. 7 in the same way as the first embodiment (step 111).

The present time is stored in the column of the "time of representation of focused data" of the timing table 42 (step 112). If the column of the "method of determining timing" of the timing table 42 is "prediction of time period for completing reading" (step 113), the contents of the relevant focused data are stored as the numerical information of the timing table 42 (step 114).

Next, in the same way as the first embodiment, the distance calculating component 37 calculates the distance between the focused data and each of the other pieces of data, and then the peripheral data determining component 38 selects 8 pieces of data which are closest to the focused data as the peripheral data (step 115), and transfers them to the layout determining component 39.

The layout determining component 39 determines the location of the set of pieces of peripheral data transferred from the peripheral data determining component 38 and stores a pointer to each piece of the peripheral data in each of the regions (2) through (9) of the layout table 40 (step 116), and then the control is transferred to the timing determining component 43.

The timing determining component 43 reads the method of determining timing from the timing table 42, and in accordance with the method, determines the timing of display (step 117).

Then the peripheral data displaying component 44 checks whether the representation flag is on or not (step 118), and if it is not, further checks whether the timing (time) of representation determined by the timing determining component 43 has occurred or not (step 119).

As a result, if the representation flag is on, or the time reaches the determined timing, the peripheral data representing component 44 reads the layout table 40 and represents each of the pieces of peripheral data corresponding to each of regions (2) through (9) on the display screen in accordance with the display assignment shown in FIG. 7 (step 120).

The peripheral data representing component 44 turns the representation flag off (step 121), rewrites the timing history table 72 (step 122), and the process is completed.

In the above-described process, the timing determining component 43 reads values of items "average waiting time for representing peripheral data" and "time of representation of focused data" from the timing history table 72 and the timing table 42, respectively, and determines the sum of those values as the time of representation of the peripheral data.

The peripheral data representing component 44 increments the value of the item "number of times of representation of peripheral data" of the timing history table 72 and calculates the average of differences between the time of representation of the focused data and the time of representation of the peripheral data again, and then stores the calculated value as the value of the item "waiting time for representing peripheral data". The value can be calculated by the following equation:

New average=((old average*the old number of times)+present difference)/(the old number of times+1).

As a method of utilizing the history, the present embodiment simply utilizes the average of the time of waiting for representation of the peripheral data. More expansively, an average of the predicted time period for completing reading calculated based on the type of medium or the kind of language of each focused data can be utilized. It is also possible that the time of representation is quickened by some percent if designation of representation of the peripheral data is successively obtained from the user for several times.

Seventh Embodiment

Figure 36:
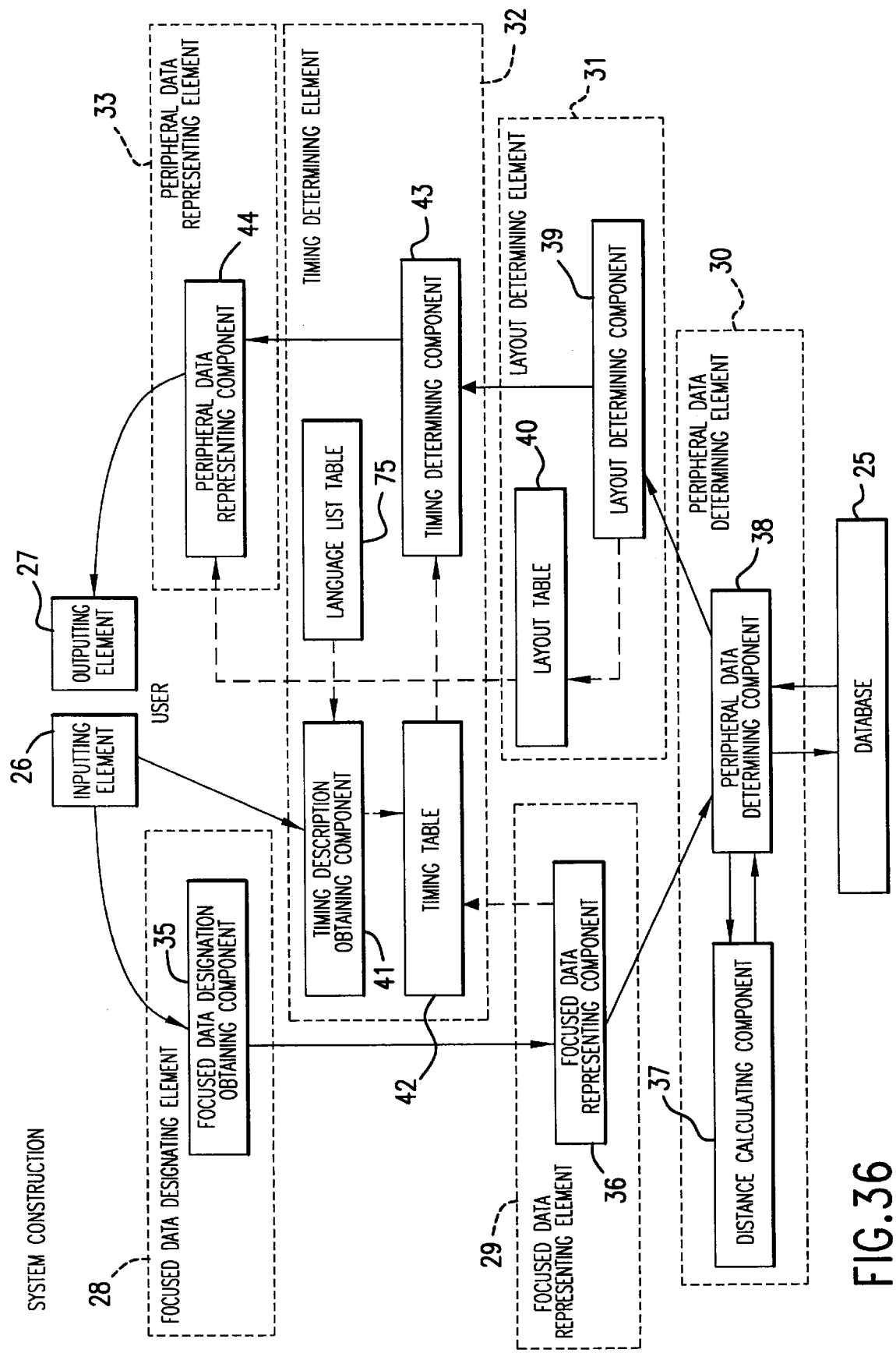
FIG. 36 shows a system construction of the seventh embodiment of the data outputting system according to the present invention.

FIG. 36 shows the construction of the seventh embodiment of the data outputting system according to the present invention. The data structure dealt with in the seventh embodiment is the same as that shown in FIG. 5. Components corresponding to components of the first embodiment have the same reference numbers as those of the first embodiment and the redundant explanations are omitted.

In addition to the construction of the first embodiment shown in FIG. 6, a language list table 75 is added to the timing determining component 32 of the present embodiment of the data outputting system. The construction of the timing table 42 of the present embodiment is different from that of the timing table 42 of the first embodiment.

As shown in FIG. 37, the language list table 75 holds three items, that is, it has a column of "language" 76, a column of "speed of silent reading of native language" 77 and a column of "speed of silent reading of familiar foreign language" 78. Thereby, for each language, such as Japanese, English and so forth, the values of the speed of silent reading of the data in the case where the language describes the content of the data as the native language and as the familiar foreign language are stored. In the present embodiment, default values are predetermined for these values of speed of silent reading, but the user can arbitrarily change them if necessary.

Figure 38:
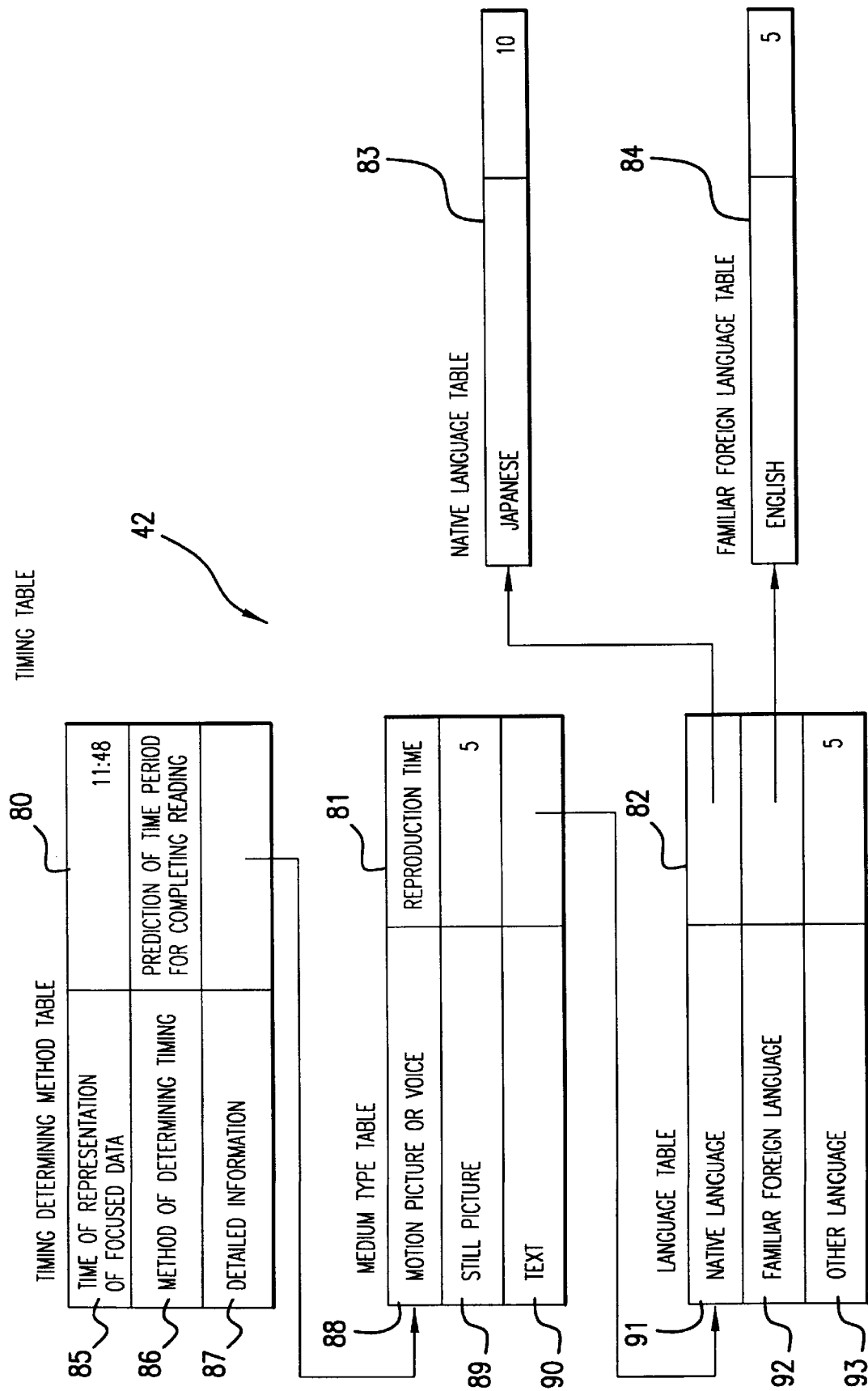
FIG. 38 shows a construction of a timing table of the seventh embodiment of the data outputting system according to the present invention.

The timing table 42 of the present embodiment has the data structure as shown in FIG. 38 which includes a timing determining method table 80, a medium type table 81, a language table 82, a native language table 83 and a familiar foreign language table 84. These tables 80 through 84 are related to one another.

The timing determining method table 80 has a column of "time of representation of the focused data" 85, a column of "method of determining timing" 86, and a column of "detailed information" 87. If the method of determining timing is "time period designation" or "no-action time period designation", a numerical value which represents time is stored in the column of "detailed information". If the method of determining timing is "prediction of time period for completing reading", a pointer to the medium type table 81 is stored in the column of "detailed information" 87.

The medium type table 81 is used only if the method of determining timing is "prediction of time period for completing reading", which has items distinguished by the types of medium of the data, namely, a column of "motion picture or voice" 88, a column of "still picture" 89 and a column of "text" 90. In the column of "text" 90, a pointer to the language table 82 is stored only when the user carries out the setting for determining timing based on distinction regarding languages.

The language table 82 is utilized only when the method of determining timing is "prediction of time period for completing reading", which has a column of "native language" 91, a column of "familiar foreign language" 92 and a column of "other language" 93. A pointer to the native language table 83, a pointer to the familiar foreign language 84 and the predicted time period for completing reading in the case of other language are stored in the column of "native language" 91, the column of "familiar foreign language" 92 and the column of "other language" 93, respectively.

Each of the native language table 83 and the familiar foreign language table 84 has a column for storing information about the kind of language and how many characters or words of the language can be read in a second. It is possible to store plural languages by expanding the table for adding a new language.

Processes in the present embodiment are the same as those in the first embodiment except for processes of the timing designation obtaining component 41 and the timing determining component 43 which are described as follows.

Figure 39:
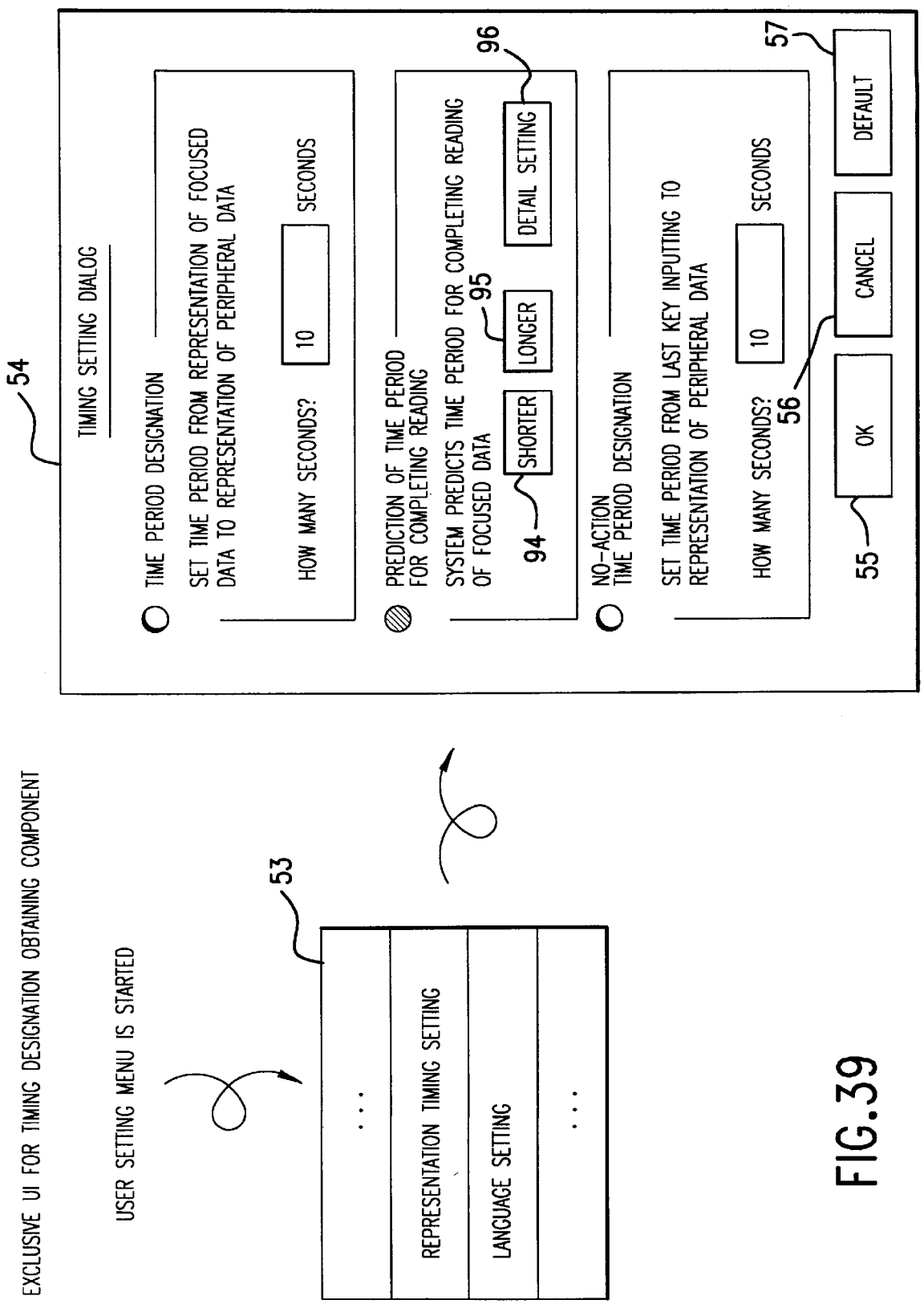
FIG. 39 shows a user interface of a timing designation obtaining component of the seventh embodiment of the data outputting system according to the present invention.
Figure 40:
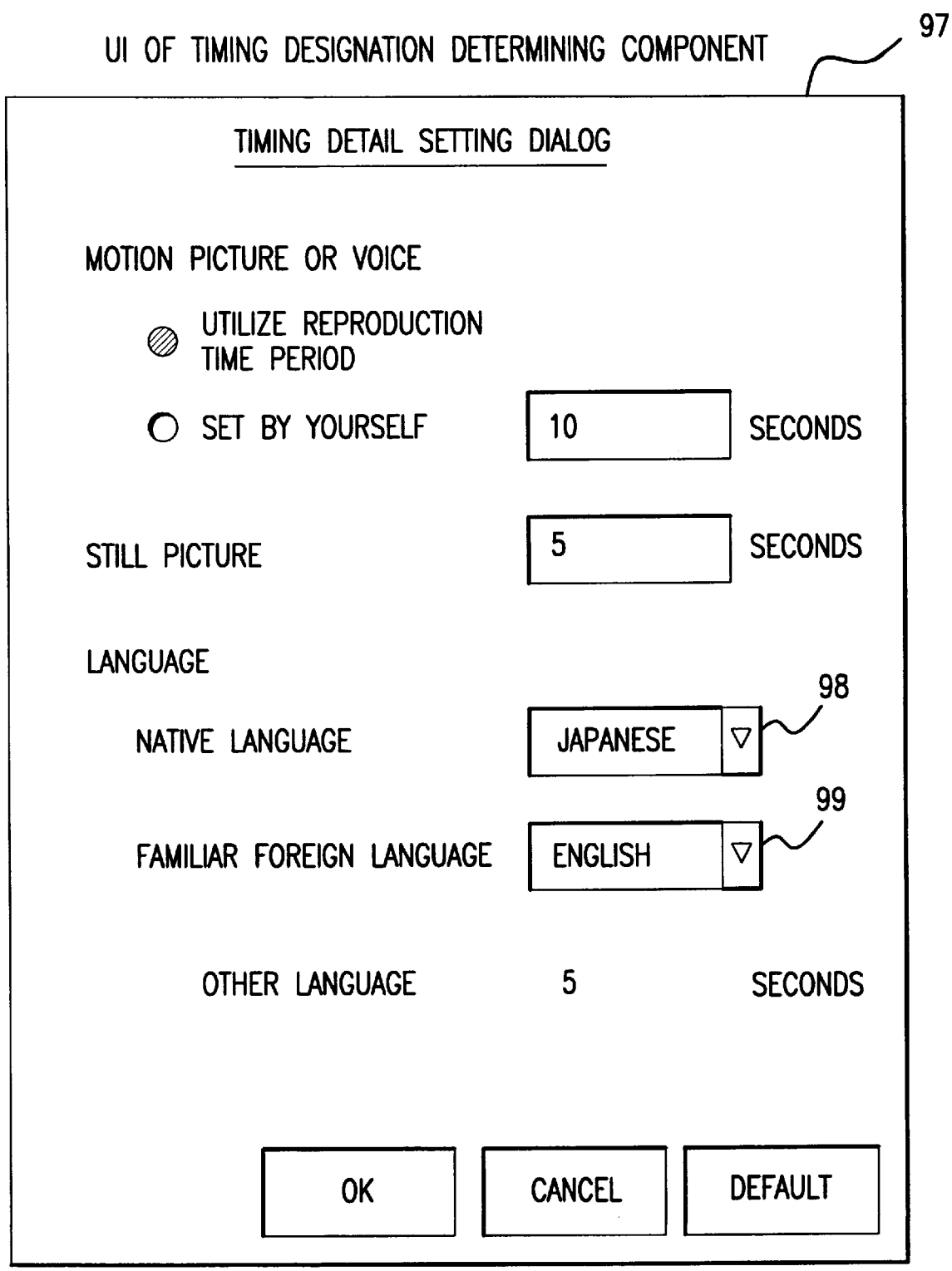
FIG. 40 shows an example of a timing detail setting dialog of the seventh embodiment of the data outputting system according to the present invention.

In the same way as shown in FIG. 11, the timing designation obtaining component 41 displays the user interface as shown in FIGS. 39 and 40 on the display screen of the outputting element 27, and obtains designation from the user through the inputting element 26. In addition to that shown in FIG. 11, buttons "shorter" 94, "longer" 95 and "detail setting" 96 are disposed in the column for setting "prediction of time period for completing reading" in the dialog 54 shown in FIG. 39. By clicking "detail setting" button 96, a timing detail setting dialog 97 is displayed on the display screen as shown in FIG. 40.

The user can customize the predicted time period for completing reading of the data of the motion picture, voice, still picture or text data described by unfamiliar foreign language by editing in the detailed timing setting dialog 97. Selection of the native language and the familiar foreign language is possible by clicking the buttons 98 and 99 having triangular marks disposed on the right of the boxes for selecting the native language and the familiar foreign language, and thereby the desirable languages can be selected from displayed available languages. The content edited by the timing detail setting dialog 97 is stored in the corresponding column of the timing table 42.

If the "shorter" button 94 disposed to the timing setting dialog 54 is clicked, each of the values of reading speed of the native language and the familiar foreign language in the timing table 42 is increased by 10 percent. Therefore, the number of characters or words readable in a second is increased, and the value of the predicted time period for completing reading is reduced. In other words, the waiting time from representation of the focused data to representation of the peripheral data can be shortened.

In contrast with the case of the "shorter" button, each of the values of reading speed of the native language and the familiar foreign language in the timing table 42 can be reduced by 10 percent by clicking the "longer" button 95. Therefore, the value of the predicted time period for completing reading is increased, that is, the waiting time from representation of the focused data to representation of the peripheral data is prolonged.

The timing determining component 43 determines the predicted time period for completing reading in the same way as the processes shown in FIGS. 18 and 19. However, unlike the processes shown in FIGS. 18 and 19 in which a value unique to the system is used in the method of determination of the predicted time period for completing reading, the present embodiment uses a value set by the user stored in the timing table 42.

Specifically, if the focused data is text data and its description language is the native language of the user, the value of the column of "native language" 91 of the timing table 42 is read. If the description language of the focused data is the familiar foreign language, the value of the column of "familiar foreign language" 92 of the timing table 42 is read. Thus the timing of representation of the peripheral data is determined according to the kind of language describing the text of the data.

As described so far, according to the data outputting system of the present invention, it is possible to appropriately set the timing of representation of pieces of the peripheral data corresponding to the focused data, and thereby the tacit viewing is realized in data outputting.

Accordingly, the following various effects are available.

Regarding discussion in a meeting or communication via telephone or electronic mail, in the data outputting system according to the present invention, since items related to the subject matter are displayed to the periphery thereof, it is possible to avoid to forget the items, and it is also possible to remind the user that, for some of such items, the efficiency can be promoted by processing them simultaneously with the subject matter as minor side issues. Therefore, efficiency in communication can be enhanced. Since the items related to the subject matter are always displayed with the subject matter though they are apparently not directly related, the user can acquire a rich stock of topics.

When the subject matter is represented as the focused data and the pieces of data related thereto are represented to the periphery, if supplements or notes are represented as the peripheral data to the periphery of the focused data, namely, the subject matter, it can be comprehensively and efficiently understood. If items to which attention should be paid for dealing with the subject matter are represented to the periphery of the subject matter, a more satisfactory job can be done without oversight and logicality can be reviewed.

Pieces of the peripheral data related to the focused data but difficult to be anticipated from the focused data are represented, and the user is unexpectedly stimulated. There occurs the possibility that the user hits on a new idea not directly related to the subject matter. Accordingly, serendipity effect is expected. While alternately paying attention to the focused data and any of pieces of the peripheral data, the user can change the background (peripheral data) of the subject matter and can freely ramble among the pieces of information according to his/her own sensitivity.

Further, when attention is paid to a specific piece of data, only the data is displayed at the center and the timing of completion of reading the data is automatically predicted, and pieces of the peripheral data related to the data are displayed at the predicted timing. Therefore, the user can efficiently process the related data without disturbing his/her concentration. Representation of pieces of information one-by-one at the appropriate timing naturally maintains the user's concentration for a long time. In other words, efficiency in data processing is improved because an unnecessary discursive mind is prevented from occurring. Moreover, it is effective to half-compulsorily generate concentration for bringing a good relaxation which causes occurrence of a conception or an idea since the conception or idea is generated in the rhythm of the cycle of concentration and relaxation.

Further, if it is set so that the peripheral data is represented at the timing which the user completely cannot predict, the peripheral data has the effect of unexpectedness of the timing of representation as well as unexpectedness of the content. Therefore, the effect of unexpectedness can be enhanced by representing the data at an unexpected timing.

The foregoing description of preferred embodiments of this invention has been presented for purposes of illustration and description. It is not intended to be exhaustive or to limit the invention to the precise form disclosed, and modifications and variations are possible in light of the above teachings or may be acquired from the practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A data outputting system comprising:

a memory that stores a plurality of pieces of data;

a representation element that represents at least one of the plurality of pieces of data stored in the memory;

a focused data designating element that selects a piece of data as focused data from the plurality of pieces of data stored in the memory;

a focused data representation element that represents the focused data using the representation element;

a peripheral data determining element that selects at least one piece of data as peripheral data from the plurality of pieces of data stored in the memory in accordance with a relation of the at least one piece of data to the focused data;

a representation timing determining element that determines timing of representation of the peripheral data selected by the peripheral data determining element; and a peripheral data representation element that represents, using the representation element, the peripheral data selected by the peripheral data determining element at the representation timing determined by the representation timing determining element.

2. The data outputting system as set forth in claim 1, wherein the representation timing determining element determines the timing of representation of the peripheral data selected by the peripheral data determining element by the representation element in accordance with an attribute of the focused data.

3. The data outputting system as set forth in claim 2, further comprising:

a reading capability memory that stores the user's reading capability for each kind of language; and a timing designating element that accepts the user's designation for changing the representation timing determined by the representation timing determined by the representation timing determining element, wherein the focused data is text data having the kind of language as an attribute, and the representation timing determining element determines the representation timing based on the kind of language describing the focused data represented by the representation element and the user's reading capability for the kind of language stored in the reading capability memory and changes the determined representation timing in accordance with the user's designation accepted by the timing designating element.

4. The data outputting system as set forth in claim 1, further comprising:

a history memory that stores a history of representation of the focused data represented by the focused data representation element, wherein the representation timing determining element determines the timing of representation of the peripheral data selected by the peripheral data determining element by the representation element in accordance with the history of representation of the focused data stored in the history memory.

5. The data outputting system as set forth in claim 1, further comprising:

a user's attribute memory that stores an attribute of a user, wherein the representation timing determining element determines the timing of representation of the peripheral data selected by the peripheral data determining element by the representation element in accordance with the attribute of the user stored in the user's attribute memory.

6. The data outputting system as set forth in claim 1, further comprising:

a user's attribute memory that stores an attribute of a user; and a history memory that stores a history of representation of the focused data represented by the focused data representation element, wherein the representation timing determining element determines the timing of representation of the peripheral data selected by the peripheral data determining element by the representation element in accordance with a combination of at least two of an attribute of the focused data, the history of representation of the focused data stored in the history memory, and the attribute of the user stored in the user's attribute memory.

7. The data outputting system as set forth in claim 1, wherein the representation timing determining element randomly determines the timing of representation of the peripheral data selected by the peripheral data determining element by the representation element.

8. The data outputting system as set forth in claim 1, wherein the representation timing determining element determines the timing of representation of the peripheral data selected by the peripheral data determining element by the representation element in accordance with a kind of medium of the focused data and a kind of medium of the peripheral data.

9. A data outputting method comprising the steps of:

storing a plurality of pieces of data in a memory;

representing at least one of the plurality of pieces of data stored in the memory using a representation element;

selecting a piece of data as focused data from the plurality of pieces of data stored in the memory;

representing the focused data using the representation element;

selecting at least one piece of data as peripheral data from the plurality of pieces of stored data in accordance with a relation of the at least one piece of data to the focused data;

determining timing of representation of the selected peripheral data; and representing the selected peripheral data at the determined representation timing using the representation element.

10. A storage medium readable by a computer having a memory that stores a plurality of pieces of data and a representation element that represents at least one of the plurality of pieces of data stored in the memory, the storage medium storing a programs of instructions executable by the computer to perform a function of outputting data, the function of outputting data comprising the steps of:

selecting a piece of data as focused data from the plurality of pieces of data stored in the memory;

representing the focused data using the representation element;

selecting at least one piece of data as peripheral data from the plurality of pieces of data stored in the memory in accordance with a relation of the at least one piece of data to the focused data;

determining timing of representation of the selected peripheral data; and representing the selected peripheral data at the determined representation timing using the representation element.

11. The data outputting system of claim 1, wherein the piece of data selected by the focused data designating element as focused data is designated by a user.

12. The data outputting system of claim 1, wherein the relation used by the peripheral data determining element to select at least one piece of data as the peripheral data from the plurality of pieces of data stored in the memory is a degree of relation of the at least one piece of data to the focused data.

13. The data outputting system of claim 1, wherein the focused data designating element selects the peripheral data as focused data when the peripheral data is represented using the representation element.

14. The data outputting system of claim 1, wherein the focused data designating element selects the peripheral data represented using the representation element as focused data.

15. The data outputting system of claim 1, wherein the representation element comprises:

a focused data representation portion in which the focused data representation element represents the focused data; and at least one peripheral data representation portion in which the peripheral data representation element represents the peripheral data selected by the peripheral data determining element at the representation timing determined by the representation timing determining element.

16. The data outputting system of claim 1, the memory stores the plurality of pieces of data in a plurality of files.

17. The data outputting system of claim 1, wherein the representation timing determining element determines the timing of representation of the peripheral data according to the content of the selected focused data.

* * * * *